United States Patent
Liu et al.

(10) Patent No.: US 10,628,236 B2
(45) Date of Patent: Apr. 21, 2020

(54) SYSTEM AND METHOD FOR INTER-DATACENTER COMMUNICATION

(71) Applicants: Huawei Technologies Canada Co., Ltd., Ottawa (CA); The Governing Council of the University of Toronto Banting Institute, Toronto (CA)

(72) Inventors: Shuhao Liu, Toronto (CA); Li Chen, Toronto (CA); Baochun Li, Toronto (CA); Jin Chen, Thornhill (CA); Chong Chen, Richmond Hill (CA)

(73) Assignees: Huawei Technologies Canada Co., Ltd., Ottawa (CA); The Governing Council of the Univeristy of Toronto Banting Institute, Toronto (CA)

( * ) Notice: Subject to any disclaimer, the term of this patent is extended or adjusted under 35 U.S.C. 154(b) by 120 days.

(21) Appl. No.: 15/615,018

(22) Filed: Jun. 6, 2017

(65) Prior Publication Data
US 2018/0349212 A1   Dec. 6, 2018

(51) Int. Cl.
| | | |
|---|---|---|
| G06F 9/54 | (2006.01) | |
| H04L 29/08 | (2006.01) | |
| G06F 9/46 | (2006.01) | |
| G06F 16/11 | (2019.01) | |

(52) U.S. Cl.
CPC ............. *G06F 9/54* (2013.01); *G06F 9/46* (2013.01); *H04L 67/1097* (2013.01); *H04L 67/325* (2013.01); *G06F 16/122* (2019.01)

(58) Field of Classification Search
CPC . G06F 9/54; G06F 9/46; G06F 16/122; H04L 67/1097; H04L 67/325
See application file for complete search history.

(56) References Cited

U.S. PATENT DOCUMENTS

| | | | | |
|---|---|---|---|---|
| 2006/0242414 A1* | 10/2006 | Corson | ............... | H04L 63/0807 713/171 |
| 2011/0225255 A1* | 9/2011 | Archer | ................ | G06F 9/5061 709/207 |
| 2014/0226800 A1* | 8/2014 | Aggarwal | ........... | H04M 3/2227 379/32.01 |

\* cited by examiner

*Primary Examiner* — Arvin Eskandarnia
(74) *Attorney, Agent, or Firm* — Slater Matsil, LLP

(57) ABSTRACT

Methods and systems for data communication in a distributed computing environment include: providing a first network node associated with a first data processing location, the first network node providing provide a network interface for a first distributed computing node at the first data processing location; and forwarding task data flow messages from the first distributed computing node to a second distributed computing node at a second data processing location via a second network node associated with the second data processing location.

27 Claims, 15 Drawing Sheets

| Work-load | # Shuffles | Total Size (GB) | Siphon Shuffle Read Time (s) | Spark Shuffle Read Time (s) | Reduction (%) |
|---|---|---|---|---|---|
| ALS | 18 | 40.47 | 46.8 | 90.5 | 48.3 |
| PCA | 2 | 0.51 | 3.3 | 13.7 | 76.1 |
| BMM | 1 | 42.3 | 48.9 | 97.8 | 50.0 |
| Pearson | 2 | 0.57 | 3.6 | 13.1 | 72.6 |
| W2V | 5 | 0.45 | 5.8 | 9.6 | 39.9 |
| FG | 2 | 0.57 | 1.77 | 1.87 | 5.4 |

SYSTEM AND METHOD FOR INTER-DATACENTER COMMUNICATION

FIELD

This disclosure relates to the field of distributed datacenters, and more particularly, to systems, devices, methods and computer-readable media for inter-datacenter communication.

BACKGROUND

In computing environments such as cloud computing or other distributed computing platforms, data and computational resources may be located at different networked or geo-distributed locations. It is increasingly common for large volumes of data to be generated and processes in a geographically distributed fashion.

In some applications, data communications may become a significant factor when trying to reduce the run time of a job on a distributed computing platform.

SUMMARY

In some situations, some embodiments of the present disclosure may provide a system for data communication in a distributed computing environment.

In accordance with one aspect of the present disclosure, there is provided a system for data communication in a distributed computing environment. The system includes: at least one processor configured to: provide a first network node associated with a first data processing location, the first network node providing provide a network interface for a first distributed computing node at the first data processing location; and forward task data flow messages from the first distributed computing node to a second distributed computing node at a second data processing location via a second network node associated with the second data processing location.

In some embodiments, the at least one processor is configured to obtain task data flow information for a plurality of tasks in the distributed computing environment; and forward the task data messages from the first distributed computing node to the second network node over one or more data connections selected based on the task data flow information.

In any of the previous embodiments, the first network node can be configured to establish at least one persistent connection with the second network node over which task data flow messages from any distributed computing node at the first data processing location can be communicated.

In any of the previous embodiments, the first network node can be configured to aggregate data communications from a plurality of task execution processes at the first data processing location for transmission over the at least one persistent connection.

In any of the previous embodiments, the first network node can be configured to establish a plurality of connections with the second network node.

In any of the previous embodiments, the first network node can be a software-implemented application-layer network node.

In any of the previous embodiments, the first network node can be configured to encapsulate data communications from the first distributed computing node into application-layer task data messages including at least one field identifying a destination task execution process.

In any of the previous embodiments, the processor(s) can be configured to forward the task data messages over the one or more data connections based on a largest flow group first schedule.

In any of the previous embodiments, obtaining the task data flow information can include obtaining data flow information for a plurality of data flows between a plurality of tasks scheduled at a plurality of data processing locations.

In any of the previous embodiments, the at least one processor can be configured to: for each unscheduled communication link between each network node associated with the plurality of data flows, determine a total transfer time to transfer all data flow portions routed through the communication link for each allocation of portions of the plurality of data flows; select, from the unscheduled communication links, a communication link having a largest total transfer time based on the shortest total transfer times for the unscheduled communication links; and schedule to be transferred across the selected communication link the portions of the plurality of data flows corresponding to the shortest total transfer time for the selected communication link.

In any of the previous embodiments, the at least one processor can be configured to: until each communication link in the plurality of data flows has been scheduled, repeat: updating the data flow information and the total transfer times for the unscheduled communication links based on the portions of the plurality of data flows being transferred across the previously selected communication link as scheduled; selecting, from the unscheduled communication link, the communication link having the largest total transfer time based on the shortest total transfer times for the unscheduled communication links; and scheduling to be transferred across the selected communication link the portions of the plurality of data flows corresponding to the shortest total transfer time for the selected communication link.

In any of the previous embodiments, forwarding the task data flow messages can comprise forwarding at least a portion of the task data flow messages from the first distributed computing node to the second network node via a third network node.

In any of the previous embodiments, the at least one processor can be configured to: for a data flow to be forwarded from the first distributed computing node at the first data processing location to a plurality of distributed computing nodes associated with a plurality of network nodes, generate a multicast distribution graph including: a first branch between the first network node and a first branch network node associated with a data processing location assigned a task having a longest execution time.

In any of the previous embodiments, the at least one processor can be configured to monitor performance data regarding one or more communication links between the first network node and the second network node, and forward the task data flow messages from the first distributed computing node to the second node over one or more data connections selected based on the performance data.

In accordance with another aspect of the present disclosure there is provided a method for data communication in a distributed computing environment. The method includes: providing a first network node associated with a first data processing location, the first network node providing provide a network interface for a first distributed computing node at the first data processing location; and forwarding task data flow messages from the first distributed computing node to a second distributed computing node at a second data processing location via a second network node associated with the second data processing location.

In some embodiments, the method includes obtaining task data flow information for a plurality of tasks in the distributed computing environment; and forwarding the task data messages from the first distributed computing node to the second network node over one or more data connections selected based on the task data flow information.

In any of the previous embodiments, the first network node can be configured to establish at least one persistent connection with the second network node over which task data flow messages from any distributed computing node at the first data processing location can be communicated.

In any of the previous embodiments, the first network node can be configured to aggregate data communications from a plurality of task execution processes at the first data processing location for transmission over the at least one persistent connection.

In any of the previous embodiments, the first network node can be configured to establish a plurality of connections with the second network node.

In any of the previous embodiments, the first network node can be a software-implemented application-layer network node.

In any of the previous embodiments, the first network node can be configured to encapsulate data communications from the first distributed computing node into application-layer task data messages including at least one field identifying a destination task execution process.

In any of the previous embodiments, the method can include forwarding the task data messages over the one or more data connections based on a largest flow group first schedule.

In any of the previous embodiments, obtaining the task data flow information can include obtaining data flow information for a plurality of data flows between a plurality of tasks scheduled at a plurality of data processing locations.

In any of the previous embodiments, the method can include for each unscheduled communication link between each network node associated with the plurality of data flows, determining a total transfer time to transfer all data flow portions routed through the communication link for each allocation of portions of the plurality of data flows; selecting, from the unscheduled communication links, a communication link having a largest total transfer time based on the shortest total transfer times for the unscheduled communication links; and scheduling to be transferred across the selected communication link the portions of the plurality of data flows corresponding to the shortest total transfer time for the selected communication link.

In any of the previous embodiments, the method can include until each communication link in the plurality of data flows has been scheduled, repeat: updating the data flow information and the total transfer times for the unscheduled communication links based on the portions of the plurality of data flows being transferred across the previously selected communication link as scheduled; selecting, from the unscheduled communication link, the communication link having the largest total transfer time based on the shortest total transfer times for the unscheduled communication links; and scheduling to be transferred across the selected communication link the portions of the plurality of data flows corresponding to the shortest total transfer time for the selected communication link.

In any of the previous embodiments, forwarding the task data flow messages can comprise forwarding at least a portion of the task data flow messages from the first distributed computing node to the second network node via a third network node.

In any of the previous embodiments, the method can include for a data flow to be forwarded from the first distributed computing node at the first data processing location to a plurality of distributed computing nodes associated with a plurality of network nodes, generating a multicast distribution graph including: a first branch between the first network node and a first branch network node associated with a data processing location assigned a task having a longest execution time.

In any of the previous embodiments, the method can include monitoring performance data regarding one or more communication links between the first network node and the second network node, and forwarding the task data flow messages from the first distributed computing node to the second node over one or more data connections selected based on the performance data.

In accordance with another aspects, there is provided a non-transitory, computer-readable medium or media having stored thereon computer-readable instructions which when executed by at least one processor configure the at least one processor for: providing a first network node associated with a first data processing location, the first network node providing provide a network interface for a first distributed computing node at the first data processing location; and forwarding task data flow messages from the first distributed computing node to a second distributed computing node at a second data processing location via a second network node associated with the second data processing location.

In some embodiments, the instructions configured the at least one processor to obtain task data flow information for a plurality of tasks in the distributed computing environment; and forward the task data messages from the first distributed computing node to the second network node over one or more data connections selected based on the task data flow information.

In any of the previous embodiments, the first network node can be configured to establish at least one persistent connection with the second network node over which task data flow messages from any distributed computing node at the first data processing location can be communicated.

In any of the previous embodiments, the first network node can be configured to aggregate data communications from a plurality of task execution processes at the first data processing location for transmission over the at least one persistent connection.

In any of the previous embodiments, the first network node can be configured to establish a plurality of connections with the second network node.

In any of the previous embodiments, the first network node can be a software-implemented application-layer network node.

In any of the previous embodiments, the first network node can be configured to encapsulate data communications from the first distributed computing node into application-layer task data messages including at least one field identifying a destination task execution process.

In any of the previous embodiments, the instructions configured the at least one processor to forward the task data messages over the one or more data connections based on a largest flow group first schedule.

In any of the previous embodiments, obtaining the task data flow information can include obtaining data flow information for a plurality of data flows between a plurality of tasks scheduled at a plurality of data processing locations.

In any of the previous embodiments, the instructions configured the at least one processor to: for each unscheduled communication link between each network node associated with the plurality of data flows, determine a total transfer time to transfer all data flow portions routed through the communication link for each allocation of portions of the plurality of data flows; select, from the unscheduled communication links, a communication link having a largest total transfer time based on the shortest total transfer times for the unscheduled communication links; and schedule to be transferred across the selected communication link the portions of the plurality of data flows corresponding to the shortest total transfer time for the selected communication link.

In any of the previous embodiments, the instructions configured the at least one processor to: until each communication link in the plurality of data flows has been scheduled, repeat: updating the data flow information and the total transfer times for the unscheduled communication links based on the portions of the plurality of data flows being transferred across the previously selected communication link as scheduled; selecting, from the unscheduled communication link, the communication link having the largest total transfer time based on the shortest total transfer times for the unscheduled communication links; and scheduling to be transferred across the selected communication link the portions of the plurality of data flows corresponding to the shortest total transfer time for the selected communication link.

In any of the previous embodiments, forwarding the task data flow messages can comprise forwarding at least a portion of the task data flow messages from the first distributed computing node to the second network node via a third network node.

In any of the previous embodiments, the instructions configured the at least one processor to: for a data flow to be forwarded from the first distributed computing node at the first data processing location to a plurality of distributed computing nodes associated with a plurality of network nodes, generate a multicast distribution graph including: a first branch between the first network node and a first branch network node associated with a data processing location assigned a task having a longest execution time.

In any of the previous embodiments, the instructions configured the at least one processor to monitor performance data regarding one or more communication links between the first network node and the second network node, and forward the task data flow messages from the first distributed computing node to the second node over one or more data connections selected based on the performance data.

Many further features and combinations thereof concerning the present improvements will appear to those skilled in the art following a reading of the instant disclosure.

These drawings depict aspects of example embodiments for illustrative purposes. Variations, alternative configurations, alternative components and modifications may be made to these example embodiments.

DETAILED DESCRIPTION

It is increasingly common for large volumes of data to be generated and processed in a distributed fashion at multiple datacenters spread across a network and/or geographically around the world.

A data analytics job can often be separated into tens to thousands of data processing tasks. Some tasks may be dependent on the results of previous tasks in the job. In some approaches, a job can be divided into a number of consecutive computation stages, each of which includes a number of data processing tasks which can be executed in parallel. To start a new computation stage, intermediate data from the preceding stage may need to be fetched from another location, which may initiate multiple network flows.

When input data is located across multiple data processing locations, all input data for a particular task is transferred to a single data processing location for execution. Depending on physical locations of datacenters or other data processing locations and network capability and conditions, data transfer times can be a significant component of the completion time for a particular task.

In some approaches, task schedulers aim avoid potential network bottlenecks by assigning tasks to data processing locations to achieve better data locality or otherwise reduce the amount of data required to be transferred to a data processing location.

However, once tasks are assigned, the transfer of data is left to the underlying networking infrastructure. Generally, this physical networking infrastructure cannot be readily changed, and distributed computing processes commonly do not have access or permissions to modify or specifically control the behaviour of the physical infrastructure.

In some instances, aspects of some example embodiments described herein may provide a network overlay to manage data transfers between data processing locations. In some situations, controlling the flow of data in a distributed computing environment, which in some embodiments may be based on task data flow information, may mitigate data bottlenecks and/or reduce job completion times.

Figure 1:
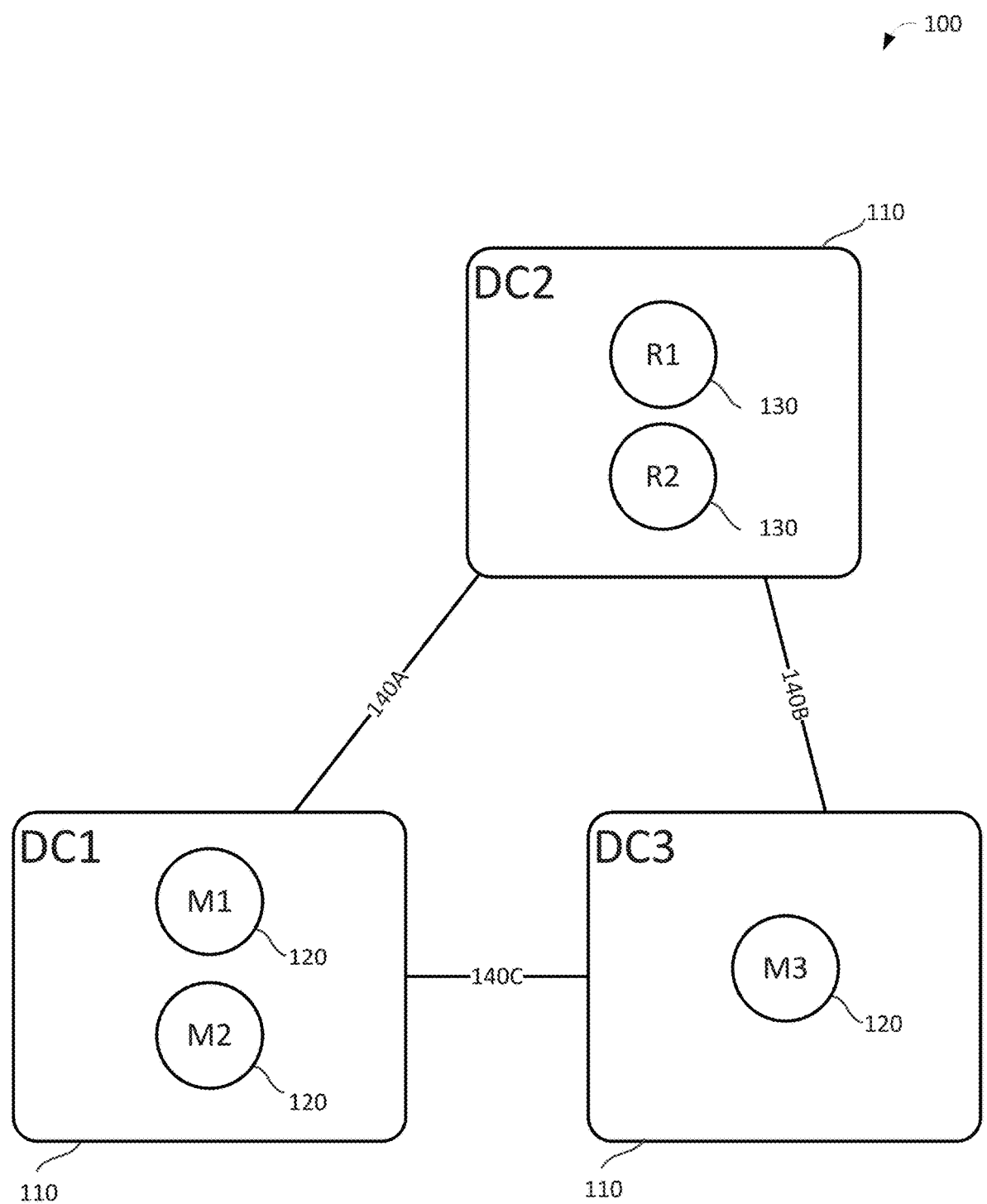
FIG. 1 is a diagram showing aspects of an example computing environment.

FIG. 1 illustrates an example distributed computing environment 100 including three datacenters 110 labelled DC1, DC2, and DC3. In an example scenario, a data processing job includes two reduce tasks (R1 and R2) 130 which have been scheduled for execution at DC2. Each reduce task R1, R2 utilizes input data from three map tasks (M1, M2 and M3) 120 at DC1 and DC3.

Figure 2:
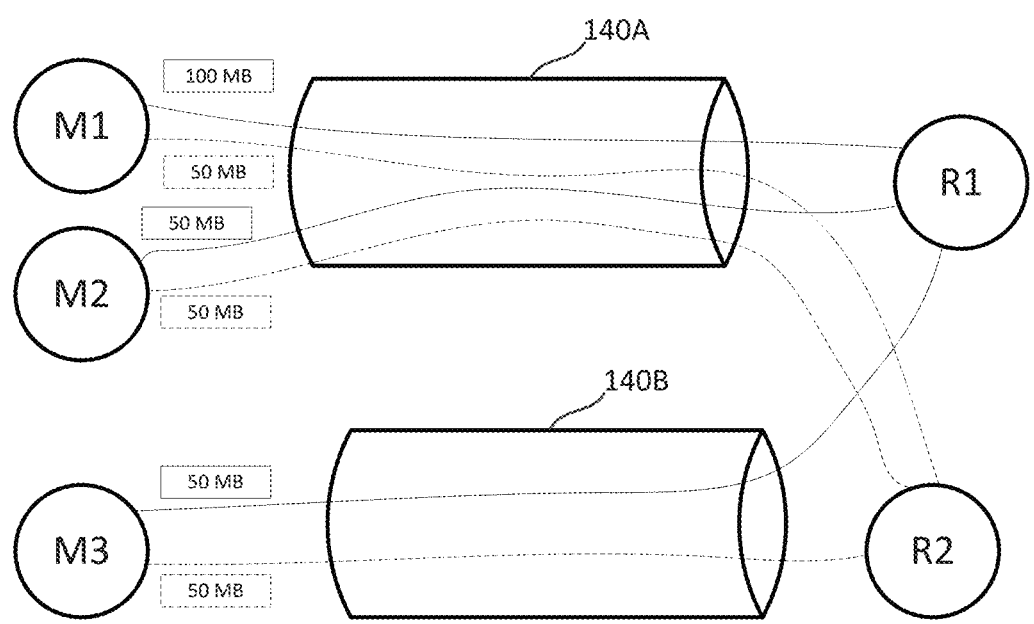
FIG. 2 is a data flow diagram showing an example data flows between tasks in the computing environment of FIG. 1.

FIG. 2 is a data flow diagram 200 illustrating the data flows between the data processing locations at which tasks M1, M2 and M3 were executed and the data processing location which will be executing tasks R1 and R2. A first flow group, Flow Group 1, includes data flows from M1 to R1, from M1 to R2, from M2 to R1 and from M2 to R2 via network connection 140A between DC1 and DC2. A second flow group, Flow Group 2, includes data flows from M3 to R1 and from M3 to R2 via network connection 140B between DC3 and DC2.

Figure 3A:
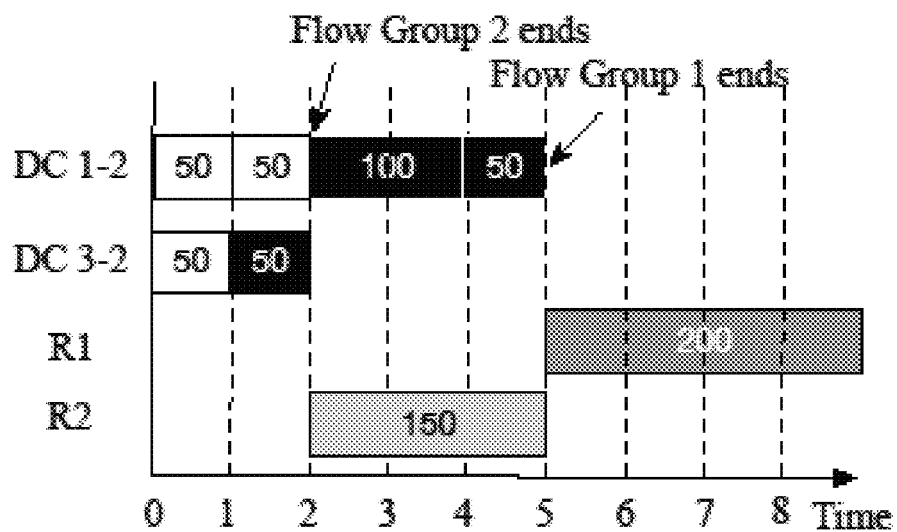
FIGS. 3A and 3B show job timelines for two different data flow schedules.

As illustrated in FIG. 3A, if the data flows in Flow Group 2 (illustrated by the white bars) are transferred across the network connections first, all of the input data for task R2 is available at time 2 resulting in a completion time for R2 at time 5 (the execution time for R2 is illustrated by the light grey bar). The data flows in Flow Group 1 (illustrated by the black bars) are transferred after the Flow Group 2 and are available to start executing task R1 (illustrated by the dark grey bar) at time 5 which completes at time 9.

Figure 3B:
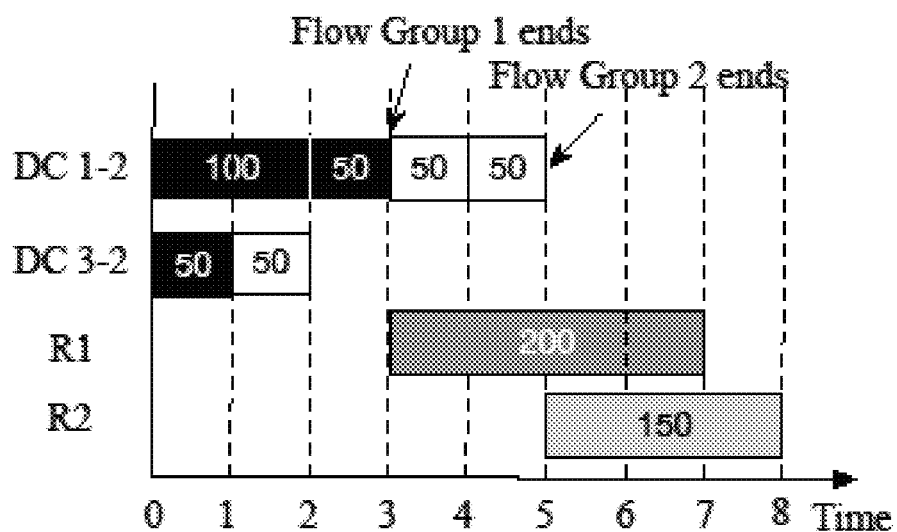

In contrast, as illustrated in FIG. 3B, if the data flows in Flow Group 1 (illustrated by the black bars) are transferred before the data flows in Flow Group 2 (illustrated by the white bars), task R1 completes at time 7 and task R2 completes at time 8. This is an improvement of the overall completion time for the job including tasks R1 and R2.

As illustrated in the task execution timelines in FIGS. 3A and 3B, irrespective of the assignment of the map and reduce tasks to particular data processing locations, the scheduling and/or management of the data flows may, in some situations, affect the completion time of a task and/or job.

Aspects of some example embodiments described herein may manage or control data communication in a distributed computing environment. In some instances, these aspects may improve the completion times for tasks and/or jobs scheduled in the distributed computing environment. In some embodiments, the control of data communications may be independent of the policies or algorithms for scheduling tasks at different data processing locations.

Figure 4:
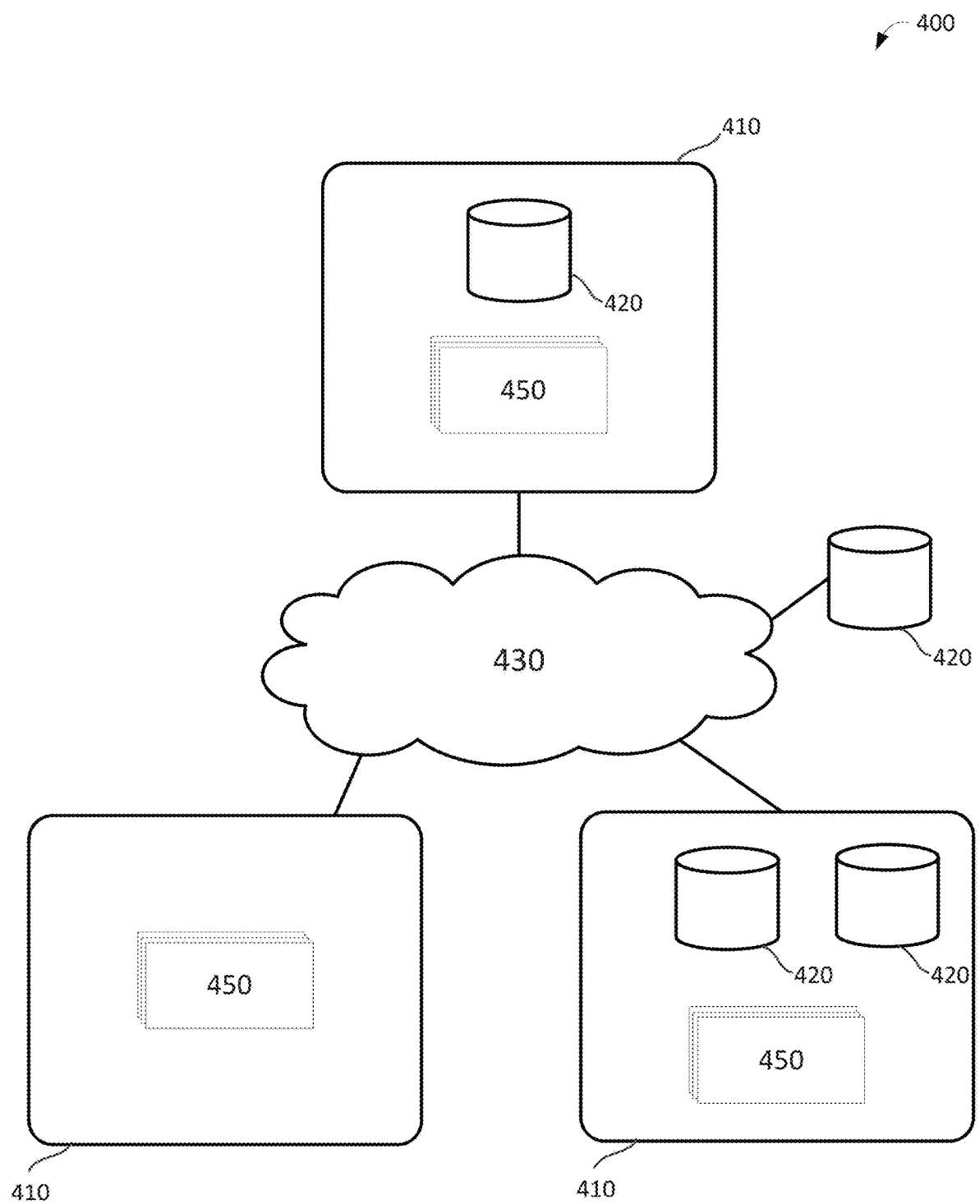
FIG. 4 is a schematic showing aspects of an example computing environment.

FIG. 4 is a schematic showing aspects of an example distributed computing environment 400 to which aspects of the present disclosure may be applied. In some embodiments, the distributed computing environment 400 can include any combination of hardware and software components, and may be referred to as a system. For example, a distributed computing environment 400 may include a combination of computing devices, processors, networks, memories, storage devices, network devices, power sources, license servers (e.g., software license servers), swap space, and the like. In some embodiments, the computing environment 400 may be a heterogeneous or a homogenous environment, and may have different or similar hardware components running different or similar operating systems.

In some embodiments, the distributed computing environment 400 may be a computing system including one or more processors in a single device or split across any number of devices. These processors can be configured to manage the resources 450 and/or schedule tasks in the computing system. The computing system can be configured as a distributed resource management (DRM) system. In some embodiments, the DRM system is an infrastructure middleware which can run on top of a distributed environment. The distributed computing environment 400 can include different kinds of hardware and software. The distributed computing environment 400 includes a number of data processing locations 410. A data processing location 410 can include one or more devices having computing resources 450. In some embodiments, a data processing location 410 can be a single device physically or logically, such as an individual computer or server. In some embodiments, a data processing location 410 can include multiple devices such as a computing system, mainframe or datacenter.

The distributed computing environment 400 can include one or more resources 450 which can be utilized to perform data processing tasks. Resources 450 can include, but are not limited to, processors (e.g. central processing units, graphics processing units, processing units or cores, integrated circuits, field-programmable gate arrays, any other computational devices, and the like), memories, network resources (ports, bandwidth allocations, etc.), software licenses, data storage devices, and any other hardware or software component, or combination thereof which can be assigned to tasks/jobs in a distributed computing environment. These resources 450 can be at any number of data processing locations 410.

Some resources 450 may be physically or logically associated with a single device, and other resources 450 may be shared resources which may be utilized by multiple devices in the distributed computing environment 400. In some embodiments, resources 150 in the computing environment 400 can have or otherwise be associated with one or more attributes or characteristics. In some embodiments, attributes can include resource type or class, resource state/status, resource location, resource identifier/name, resource value, resource capacity, resource capabilities, or any other resource information that can be used as criteria for selecting or identifying a suitable resource.

The distributed computing environment 400 can include one or more data storage devices 420 located at data processing locations 410 or elsewhere in the environment 400. The data storage devices 420 may store input, output and/or intermediate data for one or more tasks or jobs. Data may be in the form of datasets, databases, files, or any suitable format.

The data processing locations 410, resources 450, and data storage devices 420 may be connected by one or more data networks 430. The data networks 430 can include direct communication links, physical networks, logical networks, wired networks and/or wireless networks. These networks may include any number of network devices, communication interfaces, or other components for data communication between elements of the distributed computing environment. In some embodiments, data networks 430 can include communication connections between different systems or devices, and/or interconnections within a device or system (e.g. within a datacenter, within a rack, within a backplane, etc.). In some embodiments, aspects of the networks 430 themselves can be resources. For example, physical or logical connections/ports/addresses, communication bandwidths, protocols, etc. In some embodiments, various elements of the data processing locations 410 or other elements of the environment include communication interfaces and/or other suitable hardware and/or software components for communicating data across the network(s) 430.

In some embodiments, processors and/or other computer elements at the data processing locations 410 and/or elsewhere in the distributed computing environment can be configured to operate one or more distributed resource management (DRM) agents or other hardware and/or software elements for monitoring and reporting resource capabilities and/or availabilities, file sizes, network bandwidths, and/or any other information for the distributed computing elements described herein.

In some embodiments, processors and/or other computer elements in the system may be configured to operate at least portions of a DRM system including, for example, network nodes, controllers, distributed computing nodes, task executors, DRM agents, master daemons, data processing engines, job managers, directed acyclic graph schedulers, task schedulers, resources managers and/or any other DRM component or portion thereof. These DRM components may be software components, hardware components, or any combination thereof. In some embodiments, the DRM components may be implemented by machine-readable instructions being executed on one or more processors.

Aspects of embodiments described herein may, in some instances, provide and/or obtain task data flow or other task scheduling information from a task scheduler which considers task assignments across multiple jobs.

Jobs can refer to any process, service, or any other computing operation or set of operations to be run on a computing system. For example, jobs may include batch jobs (e.g., high performance computing (HPC) batch jobs), Message Passing Interface (MPI) processes, serial and/or parallel batch tasks, real time analytics, elastic applications (e.g., MapReduce), long running services, virtual machines, containers, etc.

In some instances, jobs include a number of tasks, or smaller operations which are to be completed in order to complete the job. In some embodiments, some tasks may be dependent on other tasks because they may utilize the output of a previous task as an input. In some embodiments, some tasks may be independent of and may be executed in parallel with others.

For the purposes of the present application, references to task data flows, task data flow messages and task scheduling and/or data flow information should be understood to include data flows, data flow messages, scheduling and data flow information as they may relate to jobs rather than individual tasks.

Aspects of the present disclosure may be applied to various DRM systems such as the IBM™ Platform Load Sharing Facility (LSF), Apache™ Hadoop™, YARN (Yet Another Resource Negotiator), Apache™ Spark™, PBS (Portable Batch Scheduler), OpenStack™, Huawei™ FusionSphere, FusionCube and FusionInsight.

In some embodiments, the processors and/or other resources 450 in the system provide a substrate or an underlying set of processes for managing data communication for a distributed computing environment. In some embodiments, processors and/or other resources 450 in the system may be configured to provide network nodes and/or controller(s) for handling data communications between data processing locations 410 in the system 400. In some embodiments, the network nodes and/or controller(s) may not be distinct processes or software modules but may be groups of processes, software modules or function calls which in aggregate provide a network node and/or controller.

The processors providing the network nodes and/or controller(s) may be part of a data processing location 110 such as one or more processing resource in a datacenter and/or may be a processor at any location in the system whether part of a data processing location or another subsystem or device. In some embodiments, the processor(s) in the system providing the network nodes and/or controller(s) may be spread across different data processing locations and/or other physical or logical locations in the system.

Figure 5:
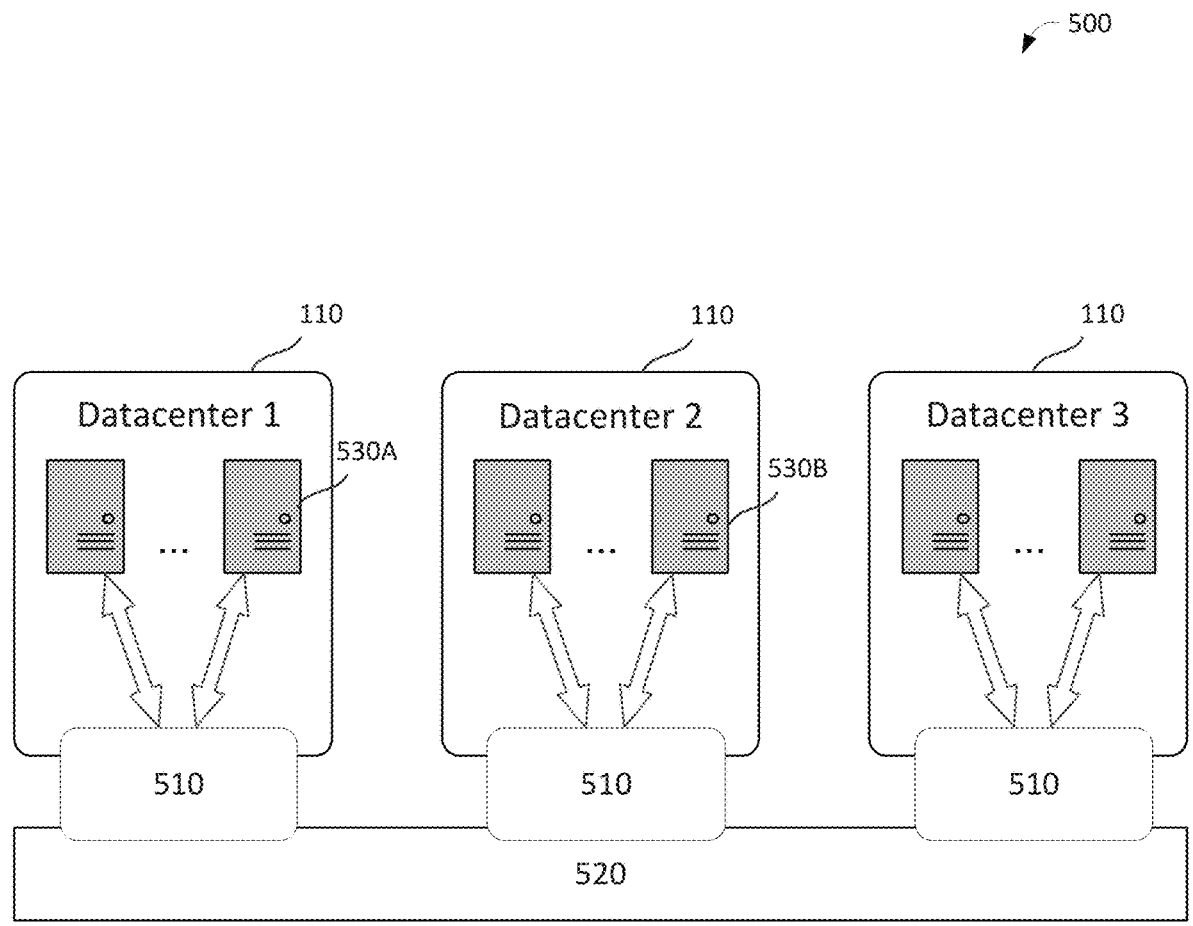
FIG. 5 is a schematic showing aspects of an example system for data communications.

FIG. 5 shows aspects of an example system 500 including three data processing locations 110 (Datacenter 1, Datacenter 2, and Datacenter 3). In other embodiments, a system may include any number of data processing locations 110.

In the example system 500 in FIG. 5, the processors provide a network node 510 for each data processing location 110. In some embodiments, a network node 510 can be a network device such as a switch or router, or can otherwise act as a communication interface for routing or forwarding data to/from task execution processes at the corresponding data processing location.

In some embodiments, some network nodes may not be associated with a data processing location. In some scenarios, these un-associated network nodes may provide additional hops and/or communication paths between source and destination network nodes.

In some embodiments, a data processing location 110 may have one or multiple corresponding network nodes.

In some embodiments, the network node 510 is a software-implemented network node. In some embodiments, the network node 510 is operated by the processor(s) at the application layer.

In contrast to a physical network device which routes data below the application-layer (e.g. at the TCP/IP layer) with little to no insight or control into the nature of the data being transmitted, an application layer network node can be controlled or otherwise integrated with a distributed computing framework such as Spark™. In some embodiments, when access to and capabilities exist on a physical network device, one or more processor(s) on the physical network device may provide a network node 510 associated with a data processing location 110.

A network node 510 is configured for handling data communications between one or more distributed computing nodes at the corresponding data processing location and other locations and/or distributed computing nodes at other locations in the distributed computing environment. For example, the network node 510 of Datacenter 1 handles data communications between distributed computing node 530A and any distributed computing node (e.g. 530B) at another data processing location. Similarly, the network node of Datacenter 2 handles data communications for distributed computing node 530B.

In some embodiments, a distributed computing node 530A, 530B may be a worker node, a data node, or any other type of node in a distributed computing environment. In some embodiments, a distributed computing node can be a server, a computing device, a combination of hardware and/or software elements, a process, a virtual node, a container, or the like.

In some embodiments, the distributed computing nodes 530A, 530B are configured to operate one or more task execution processes. A task execution process 530A, 530B can be any process at a data processing location for processing or otherwise handling some aspect of a data processing engine such as an executor, a node, a worker, a scheduler and/or any process supporting communication aspects of these processes. For example, a task execution process can be a process in charge of or otherwise involved in the execution of a task and/or job.

In some embodiments, the processor(s) are configured to forward data communications between one or more task execution or other processes at a distributed computing node 530A at one data processing location (e.g. Datacenter 1) and one or more task execution or other processes at a distributed computing node 530B at another data processing location (e.g. Datacenter 2). In some instances, the data communications can be data flow(s) required by task(s) scheduled for execution at the destination distributed computing node.

The data flows can be forwarded over one or more data connections 520. In some embodiments, the selection of the data connections for transmitting a data flow is based on the destination data processing location for the data flow and/or other factors as described herein or otherwise.

In some scenarios, the data may be forwarded between the distributed computing nodes via multiple hops involving two or more network nodes 510. In some scenarios, portions of a single data flow may be communicated across different data connections.

In some embodiments, the network nodes 510 communicate over one or more data connections 520. In some embodiments, the processor(s) establish and maintain the data connection(s) between the network nodes 510 irrespective of whether data communications between the network nodes have been requested. In some embodiments, the data connection(s) may be persistent. In some embodiments, by pre-establishing or maintaining data connection(s) whether or not data is being transmitted, the warm up time required to establish new connections every time a new data flow to be transferred may be mitigated or eliminated. This can, in some instances, shorten the data transmission times and/or execution times for a task/job. For example, for a data shuffle involving thousands of data flows, utilizing pre-established connections can potentially reduce or eliminate the overhead of thousands of TCP slow starts.

In some embodiments, the data connections 520 may be TCP connections or any other suitable connection/protocol over a communication link. In some embodiments, the processor(s) can establish multiple parallel data connections between two network nodes. In some embodiments, the processor(s) can establish a number of parallel data connections that are required to utilize the full bandwidth of the underlying physical network connection(s) between the network nodes.

Figure 6:
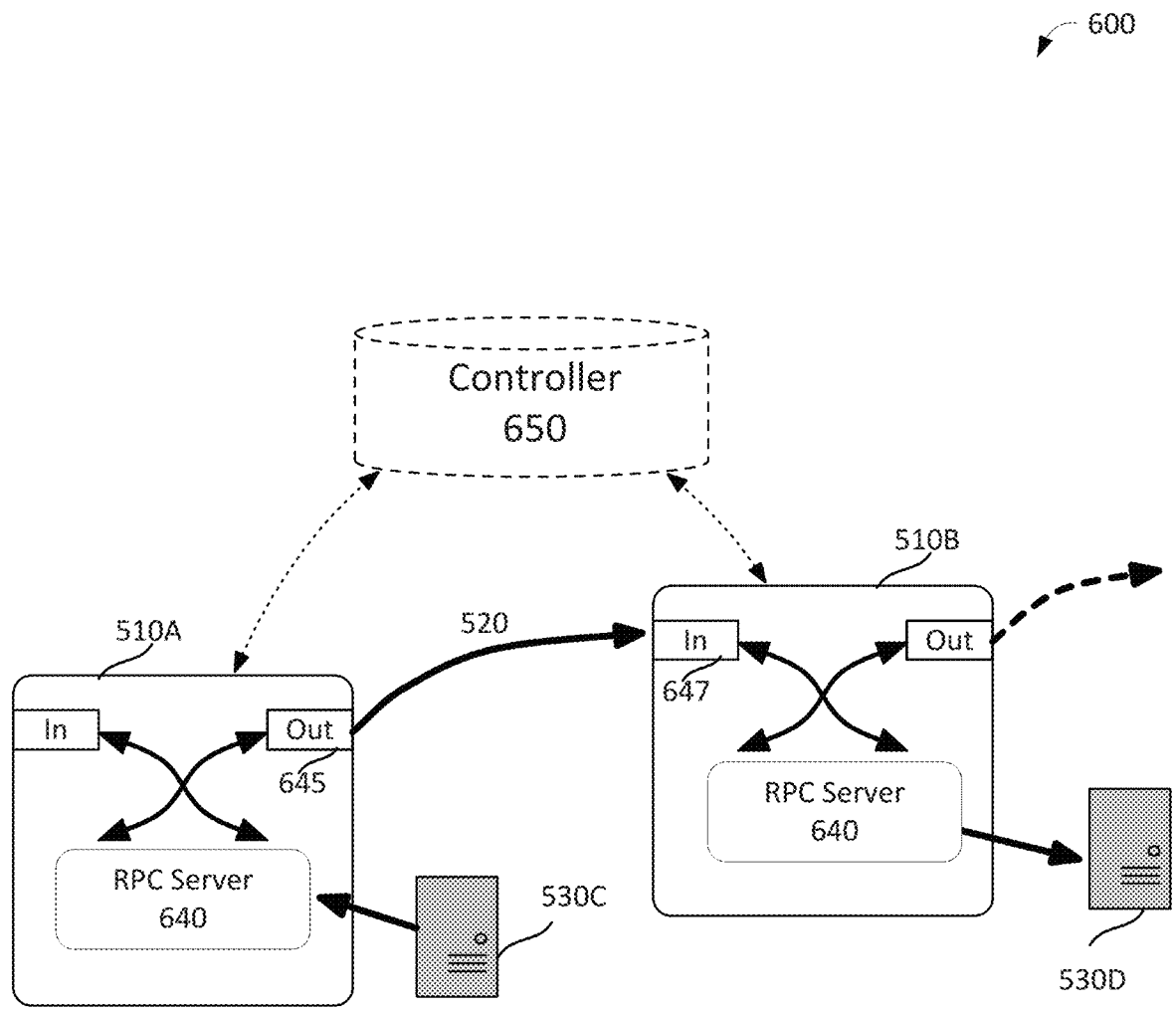
FIG. 6 is a schematic showing aspects of an example system and data flow involving two network nodes.

FIG. 6 shows aspects of an example system 600 and data flow involving two network nodes 510A, 510B. The network nodes have a communication interface for communicating with one or more distributed computing nodes 530C, 530D. In some embodiments, the communication interface may include a virtual or software port, address, input/output device, and/or the like.

When a distributed computing node such as node 530C illustrated in FIG. 6 is to send data to another distributed computing node (e.g. 530D), the source distributed computing node 530C sends the data to its corresponding network node 510A. In some embodiments, the source distributed computing node 530C communicates the data along with identifier(s) or other data identifying a destination network node 510B, a destination distributed computing node 530D, and/or a task execution or other process running at that node.

Upon receiving data communications from a distributed computing node 530C, the network node 510A identifies any data scheduling parameters and/or rules applicable to the received data communications. In some embodiments, the network node 510A is configured to store and/or buffer the data communications in an output buffer 645 until they are scheduled for transmission. When transmitting the data, the network node 510A sends the data communications to a destination network node 510B via a corresponding data connection 520 and/or an output buffer which buffers data before it is sent via the data connection 520.

The data communication are received and stored and/or buffered in an input buffer 647 at the destination network node 510B until they are processed and forwarded to the destination distributed computing node 530D.

In some embodiments, the network node 510A includes one or more process(es) which provide an RPC (Remote Procedure Call) server 640 for providing an interface and/or node between the task execution processes/distributed computing nodes at a data processing location and the network connection(s) with other data processing locations. In other embodiments, the interface and/or node between the task execution processes/distributed computing nodes at a data processing location and the network connection(s) with other data processing locations may be provided by any other suitable combination of resources and/or processes operating on one or more processors In some embodiments, one or more processors and/or other resources in the system 600 (e.g. memory resources, communication resources, etc.) are configured to provide a controller 650. The controller 650 is, in some embodiments, a logically centralized entity which in some scenarios may centralize network data, task data flow information and/or control decisions for the data communication system 600.

In some embodiments, the controller 650 is a collection of one or more processes operating on one or more processors and/or resources to provide the features of the controller 650. In some such embodiments, some or all of the processor(s) and/or other resources used to provide the network nodes are also used to provide the controller 650. In some embodiments, the network nodes may be logically classified as a data plane, and the controller may be logically classified as a control plane.

In some embodiments, the controller 650 is configured to make routing and/or scheduling decisions for data flows between network nodes 510. In some embodiments, the controller 650 is configured to monitor the available network nodes 510, the network topology, and the like. In some embodiments, the controller 650 is configured to receive network performance data from the network nodes 510 or otherwise from the system 600.

In some embodiments, the network performance data can include data connection statuses, bandwidths, latencies, network health, jitter, throughput, and the like.

In some embodiments, the controller 650 is configured to obtain task data flow information from a distributed computing manager. In some embodiments, the distributed computing manager can be a cluster manager, a job manager, a resource manager, a task scheduler, an application driver program and/or any other program/process in a distributed computing environment which can provide task data flow information.

In some embodiments, task data flow information includes data identifying data flow sources, destinations and/or sizes for tasks or jobs executing or to be executed in the distributed computing environment. In some embodiments, task data flow information includes estimated execution times for a task receiving a data flow. Alternatively or additionally, in some embodiments, the task data flow information includes information from which any of the aforementioned data can be determined.

In some embodiments, the task data flow information includes information regarding some or all data flows in a data shuffle. In some embodiments, the task data flow information includes information regarding some or all data flows for each stage of a job scheduling process. In some embodiments, the task data flow information includes information regarding some or all data flows for jobs and/or tasks scheduled or to be scheduled for execution at data processing locations by a job/task scheduler or other suitable process.

In some embodiments, the controller 650 is configured to generate data flow routing and/or scheduling based on the task data flow information. In some scenarios, the task data flow information may be aware of all data flows required for a set of data processing tasks, as well as data regarding the data connections between these data processing tasks. In some embodiments, this controller 650 may be configured to generate data flow and/or scheduling with a global view of all the data flows and/or jobs/tasks as a whole.

In contrast to a system which routes data flows naively, in some instances, by routing/scheduling data flows based on task data flow information, some embodiments may provide better data transfer performance and/or allow slowing tasks to start processing sooner. In some instances, this may improve processing times and/or throughput of the system.

Figure 7:
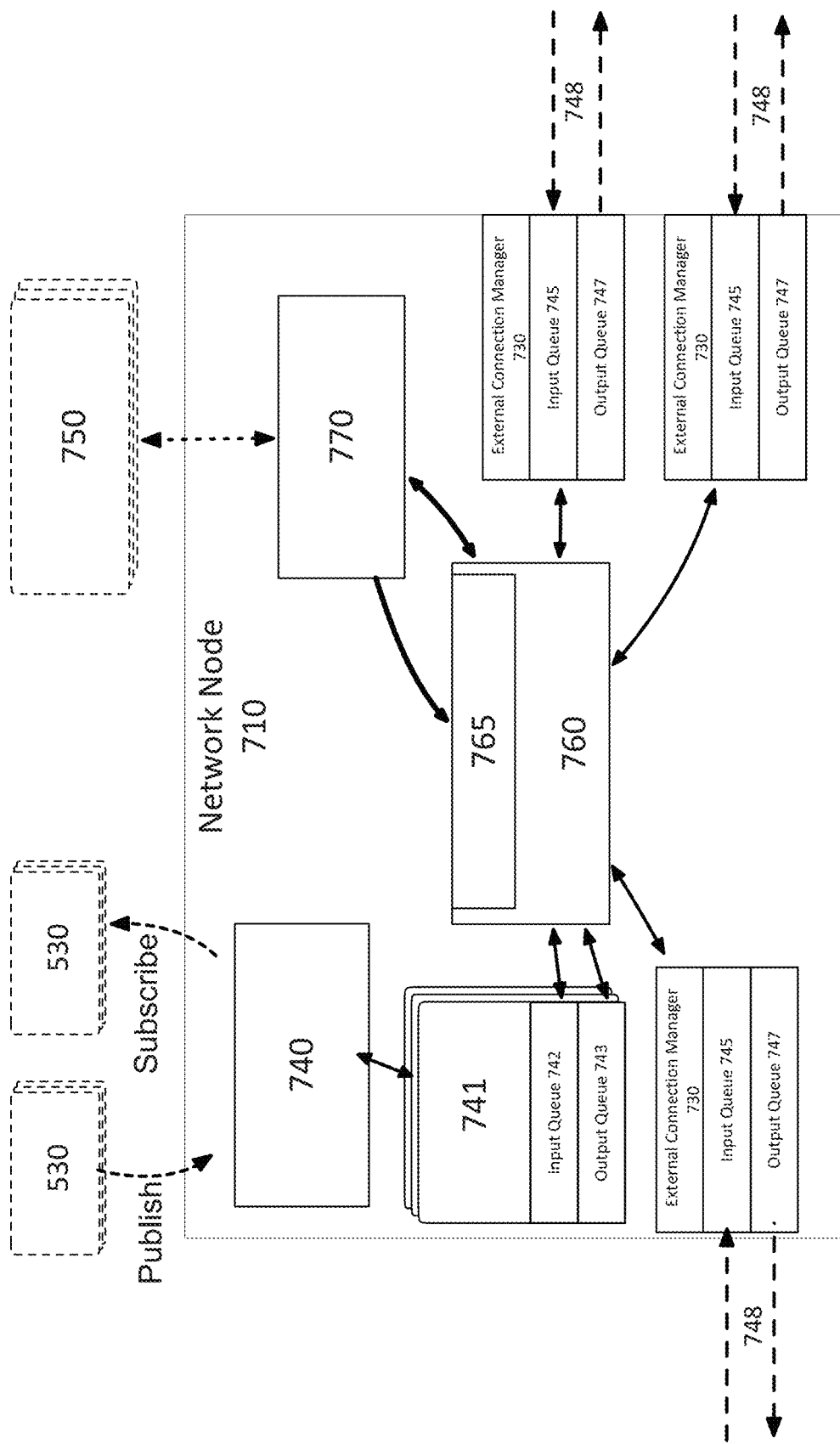
FIG. 7 is a schematic showing aspects of a network node.

FIG. 7 is an architecture diagram showing aspects of an example network node 710 provided by one or more processors in the system. In some embodiments, the processor(s) provide multiple network nodes in the system, each network node corresponding to and handling data communications for one or more data processing locations. In some embodiments, a group of network nodes collectively form a substrate that supports inter-data processing location transfers within a distributed computing environment. In some embodiments, a network node is implemented as a software-defined switch operating at the application layer.

In some embodiments, a network node 710 includes a connection manager 720 for managing connections with distributed computing nodes 530 at a data processing location corresponding to the network node 710. In some embodiments, the connection manager includes a processor and/or process(es) running on a processor.

In some embodiments the connection manager 740 includes a server for handling communications between the network node and the distributed computing nodes 530. For example, in some embodiments, the connection manager 740 includes an RPC server. In some embodiments, the RPC server has a publish-subscribe API (application programming interface) for receiving from and forwarding data to distributed computing nodes 530.

In some embodiments, to send outgoing data, a task execution or other process at a distributed computing node calls a publish function call to send outgoing data to the network node. In some embodiments, the publish call includes one or more identifiers identifying a destination data processing location, distributed computing node and/or task execution process.

In some embodiments, to receive incoming data, a task execution or other process at a distributed computing node calls a subscribe function call to provide data informing and/or enabling the network node to appropriately forward incoming data addressed to the task execution process/distributed computing node.

In some embodiments, the publish and/or subscribe calls are streaming function calls to enable future messages to be sent or delivered in a sequence of function calls. In some embodiments, this bi-directional streaming can be implemented using the gRPC framework and HTTP/2-based transport at the application layer. In some embodiments, streaming calls may incur a shorter buffering time.

In some embodiments, the connection manager 740 may be configured to fragment and/or reassemble data communications between the network node and the distributed computing nodes 530.

Figure 8:
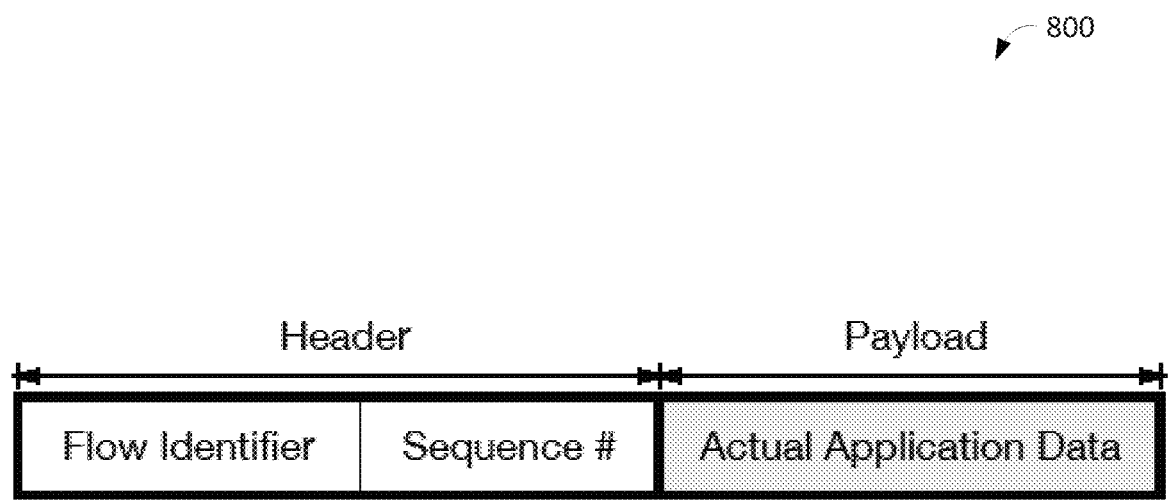
FIG. 8 shows an example data flow message.

In some embodiments, the connection manager may fragment, combine, or otherwise encapsulate data flows into application-layer messages or data units. In some embodiments, a data flow is split into a sequence of messages before being forwarded to their destination network nodes where they are reassembled and delivered to the final receiver. In some embodiments, each message includes a header or other data structure which includes a field indicating to which flow the message belongs, and a sequence number for reassembly. FIG. 8 shows an example message 800 with a header including a flow identifier and a sequence number; and a payload including actual application data. In some embodiments, the message can include a field identifying a destination task execution process and/or a destination distributed computing node. In some embodiments, the message can include a field identifying a destination network node associated with the data processing location of the destination task execution process and/or a destination distributed computing node.

In some embodiments, the processor(s) providing the network node 710 are configured to operate a process or function(s) such as an application proxy 741. In some embodiments, the connection manager 740, application proxy 741 or any other process/function operating on the processors store messages on an input queue 742 before they are forwarded by the switching device 760.

When messages are received, the processors reorder and/or store the messages in an output queue 743. In some embodiments, the messages in the output queue 743 are ready to be reassembled when retrieved by the connection manager/RPC server 740.

In some embodiments, the processor(s) providing the network node 710 are configured to operate process(es) or function(s) for managing external connections. In some embodiments, these process(es) or function(s) may be a logical external connection manager 730. In some embodiments, each external connection manager 730 is configured to manage communications for its corresponding inter-data processing location communication link. In some embodiments, the external connection manager 730 handles network I/O asynchronously with I/O events.

In some embodiments, the external connection manager 730 or other process/function operating on the processor(s) manages a set of one or more pre-established connections (e.g. TCP) 748 to another data processing location. In some scenarios, the user of multiple pre-established connections in parallel may help saturate available bandwidth capacities on the communication link.

In some embodiments, underlying connections 748 are implemented as workers which produce data for the shared input queue 745 and/or consume data from the shared output queue 747. For example, when a worker TCP connection receives a complete message, it enqueues the messages into the input queue 745, and in some embodiments, triggers a notification event, notifying the downstream switch 760 to forward it to the destination. In this manner, in some scenarios, messages received from all underlying TCP connections are consumed sequentially.

In some embodiments, messages with known next-hops destinations are buffered in the output queue 747 of the corresponding communication link. When a worker TCP connection is ready to send data, it dequeues one message from the message queue and sends it over the communication link.

In some embodiments, the external connection manager 730 is configured to consider weights and/or priority values assigned to individual data flows/messages. In some embodiments, when the communication link is backlogged, the processor(s) are configured to prioritize data flows/ messages and/or to allocate bandwidth based on these weights, priority values and/or other factors.

In some embodiments, the external connection managers 730 or other processes/functions are configured to measure, monitor or otherwise obtain performance data for the corresponding communication link. In some embodiments, the performance data can include one-way delay, round-trip time, throughput, etc. on each of its inter-data processing location connections, and/or estimates of available inter-data processing location bandwidths. In some embodiments, performance data can be obtained periodically (e.g. every 15 seconds) or in any other continuous manner for providing somewhat live or up-to-date data. In some embodiments, this data is used to make decisions about flow routing and/or scheduling.

In some embodiments, the processor(s) are configured to provide a networking device 760 such as a switch or other networking device for forwarding/routing data. In some embodiments, the network device 760 is an application-layer network device.

In some embodiments, the network device 760 includes, accesses or otherwise looks up values in a forwarding table 765. In some embodiments, the forwarding table 765 stores all forwarding rules in a hash table or other data structure. In some embodiments, the forwarding table 765 includes a data set for each flow identifier. In some embodiments, the data set includes data identifying a next-hop network node, and/or any additional information about flow scheduling.

In some embodiments, when a message from an input queue 742, 745 is to be forwarded, the network device 760 attempts to match its flow identifier with the rules in the forwarding table. If a match is found, the message is added to the corresponding output queue 743, 747.

If a match is not found, the message is flagged as pending and a corresponding query message is sent to a controller 750 to determine where the message is to be forwarded. In some embodiments, when a response is received, a new rule/data set is stored in the forwarding table allowing pending messages are forwarded to the appropriate output queue.

In some embodiments, new forwarding rules/data sets for the forwarding table 765 are received from one or more controllers 750. In some embodiments, the network node includes a controller proxy 770. In some embodiments, the controller proxy 770 parses messages from the controller 750 and stores any new or updated data sets/rules in the forwarding table 765.

In some embodiments, the worker processes are configured to automatically stop handling input messages when an output queue is full. This may result in input queue(s) becoming full which in turn results in dropped messages from incoming data connections. In some scenarios, this use of queues and connection protocols such as TCP prevent the network device 760 from becoming overrun.

Figure 9:
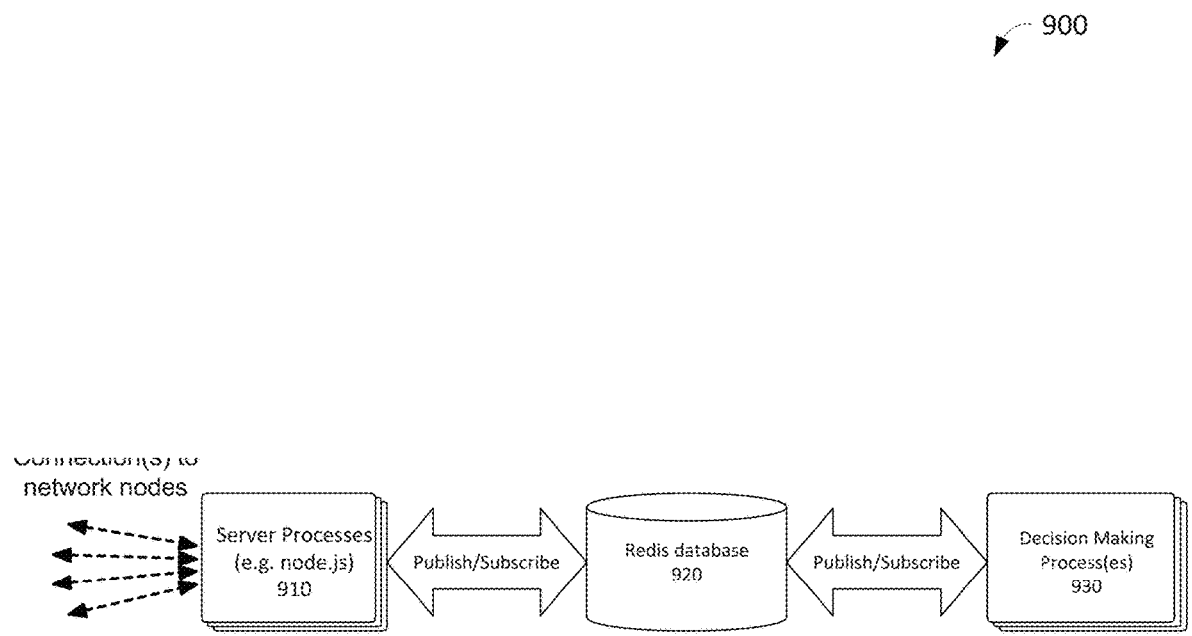
FIG. 9 is an architecture showing aspects of a controller.

FIG. 9 is an architecture diagram showing aspects of an example logical grouping of processes and resources. In some embodiments, some or all of these processes and resources logically form a controller 900. The controller can, in some embodiments, be a centralized entity. In other embodiments, the controller is distributed across multiple servers, virtual machines, processors and/or other resources.

In some embodiments, one or more processor(s) in the system are configured to receive and/or monitor performance data regarding the communication links between the data processing locations.

In some embodiments, the processor(s) are configured to receive and respond to query messages from the network node(s) including messages querying along which route to forward a particular data flow.

In some embodiments, the processor(s) are configured to receive data flow information from a distributed computing manager. In some scenarios, the data flow information can provide a complete picture of the data flows to be transferred between data processing locations/distributed computing nodes/task execution processes during a shuffle or stage for a set of data processing jobs.

In some embodiments, the processor(s) are configured to generate data defining scheduling and/or routing information for the data flows in the system. In some embodiments, the scheduling and/or routing information can include data flow priorities, data flow routing orders, next hop information for a data flow, path information for routing a data flow, information identifying network nodes corresponding to one or more task execution processes, and/or any other information which can be used to control the scheduling and/or routing of data flows in the system.

FIG. 9 shows an architecture of an example controller 900. In this example architecture, a database server 920 stores network status information including received performance data. In some embodiments, network status information may include network node locations, links between network node locations, available bandwidths, latencies, network reliability, and/or any other information regarding the communication links between network nodes, and/or the location of various network nodes/distributed computing nodes/task execution processes.

In some embodiments, the database server 920 may include task placement information and/or data flow information between tasks/locations. In some embodiments, task placement information may identify a data processing location and/or a task execution process to which a task is assigned. In some embodiments, data flow information can include a source, a destination, information regarding the task requiring the data flow, data flow size, and the like.

In some embodiments, the controller 900 may receive task placement information and/or data flow information from a distributed computing manager.

In some embodiments, the database server 920 is a Redis™ database server. In some embodiments, the database server 920 receives data, receives requests and/or sends request responses using a publish/subscribe model.

In some embodiments, the controller 900 includes one or more server processes 910. In some embodiments, the server processes 910 handle connections with the network nodes. In some embodiments, the server processes are configured to parse reports (e.g. performance data) and/or requests (e.g. requests requesting data indicating how a data flow should be routed) from network nodes. In some embodiments, the server processes 910 are configured to send responses to requests which may include control decision data generated by decision making processes 930. In some embodiments, the server processes 910 are configured to retrieve and/or store some or all of the data it handles at the database server 920. In some embodiments, the server processes are implemented in node.js.

In some embodiments, the controller 900 includes one or more decision making processes 930. In some embodiments, the decision making processes 930 are configured to generate control decision data based on data from the database server 920. In some embodiments, the decision making processes 930 are configured to generate routing and/or scheduling data based on one or more algorithms as described herein or otherwise.

In some embodiments, a controller 900 can be deployed on a single machine or a cluster of machines. In some embodiments, controller components such as server processes 910, server database 920 and/or decision making processes 930 can be distributed multiple servers or virtual machines. In some embodiments, this architecture may allow for scaling without incurring additional configuration or management costs.

Figure 10:
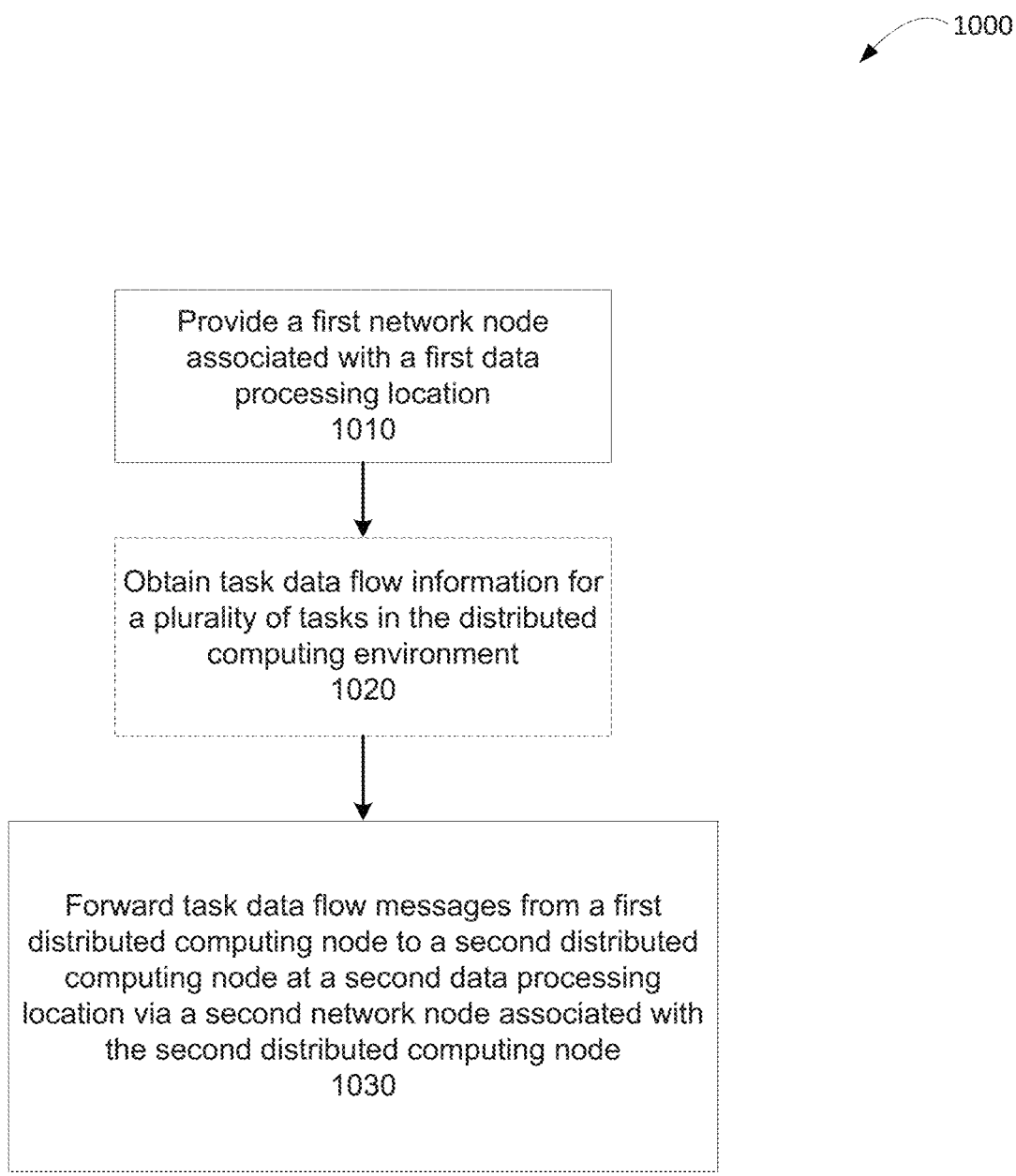
FIG. 10 is a diagram showing aspects of an example method for data communications.

FIG. 10 is a flowchart showing aspects of an example method 1000 for data communication in a distributed computing environment. At 1010, one or more processor(s) in the system are configured to provide a network node associated with a data processing location. For example, processor(s) at Datacenter 1 or elsewhere in the system may provide a network node logically or physically situated at Datacenter 1. In other embodiments, the network node may be logically or physically situated proximate to or elsewhere in the system. In some embodiments, the network node is associated with a data processing location based on its physical or logical location, and/or by virtue of the network connection(s) and/or functionality it provides to the data processing location.

In some embodiments, the network node provides a network interface for one or more distributed computing nodes at the associated data processing location. For example in FIG. 5, the network node 510 associated with Datacenter 1 provides a network interface for distributed computing nodes 530A at Datacenter 1. In some situations, the distributed computing nodes 530A may connect to the network node 510 via the network interface, and may send to and/or receive data from another data processing location over this connection.

In some embodiments, the network node is communicably connected with other network nodes via one or more physical and/or location network connections, network devices, etc.

In some embodiments, the processor(s) provide the network node as a software network node (e.g. an application-layer network node). In some embodiments, the processor(s) may be part of or work in conjunction with a network device such as a router or switch.

At 1030, the processor(s) are configured to forward task data flow messages from a distributed computing node at a first data processing location to a second distributed computing node at a second data processing location via a second network node. For example, with reference to FIG. 6, one or more processors are configured to forward task data flow messages from distributed computing node 530C at a first data processing location to distributed computing node 530D at a second data processing location via network node 510B which is associated with the second data processing location.

In some embodiments, forwarding the task data flow via the second network node is based on a path, next hop, and/or destination information in a message data structure which includes an identifier and/or address of the second network node.

In other embodiments, forwarding the task data flow via the second network node can be based on a forwarding table, and/or any other mechanism described herein or otherwise.

In some embodiments, forwarding the task data flow includes switching, routing or otherwise transmitting a data flow message at the network node on a communication link based on a destination for the data flow message.

In some scenarios, task data flow messages can include portions of data flow data from a single source distributed computing node to a single destination distributed computing node. In other scenarios, task data flow messages can include portions of data flow data from any number of source distributed computing nodes at a first data processing location to any number of destination distributed computing nodes at any number of destination data processing locations.

A data flow may be considered to be data (e.g. split into a set of data flow messages) for transmission between a particular source distributed computing node and a particular destination distributed computing node.

In some embodiments, task data flow messages being forwarded between a first network node and a second network node may include portions of a data flow from any number of source distributed computing nodes at a first data processing location associated with the first network node to any number of destination distributed computing nodes at a second data processing location associated with the second network node. In some embodiments, the data flow messages for different data flows (i.e. data flows having different source distributed computing nodes and/or different destination distributed computing nodes) may be aggregated, intermingled, or otherwise share data connection(s) between the first and second network nodes.

In some scenarios, data flow messages from different data flows can be intermingled and transmitted in a first in, first out or any other order. In some scenarios, data flow messages for one data flow may be transmitted before or otherwise prioritized over data flow messages for another data flow.

In some embodiments, the processor(s) forward task data flow messages to a destination network node over one or more data connections. In some embodiments, these data connections include direct connections between the source network node and the destination network node. In some embodiments, the data connections include connections to an intermediate node between the source network node and the destination network node.

In some embodiments, the data flow messages for a single data flow may be transmitted/forwarded over multiple data connections between a source network node and a destination network node. Similarly, a group of intermingled/aggregated data flows for transmission between a source network node and a destination network node may be transmitted/forwarded over multiple data connections.

In some embodiments, at 1020, the processor(s) obtain task data flow information for a plurality of tasks in the distributed computing environment. In some embodiments, the task data flow information may include information regarding tasks being executed on distributed computing nodes in the system and/or tasks scheduled for execution on distributed computing nodes in the system.

With the task data flow information, in some embodiments, at 1030, the processor(s) forward data flow messages over one or more data connections selected based on the task data flow information. In some embodiments, the data connections are selected based on a forwarding table.

In some embodiments, the data connections are selected based on one or more routing/scheduling parameters and/or algorithms as described herein or otherwise.

In some embodiments, one or more processors in the system establish one or more persistent connections between two network nodes. In some embodiments, these persistent data connections can be used to transmit data flow to and/or from any distributed computing node at a data processing location associated with one of the two network nodes.

In some situations, data flow messages including aggregated data flow messages for multiple tasks may be transmitted over one or more of the persistent data connections.

In some embodiments, the processor(s) forward task data flow messages based on one or more scheduling policies as described herein or otherwise. In some embodiments, two or more scheduling policies may be orthogonal or may otherwise be applied in conjunction with one another.

In any of the scheduling mechanisms described below, when suitable, some or all aspects described with respect to one scheduling mechanism may be similarly applied to another scheduling mechanism.

Largest Flow Group First Schedule

In some embodiments, the processor(s) forward task data flow messages based on a largest flow group first schedule. Using the task data flow information, the processor(s) identify one or more task data flows as a flow group. In some embodiments, all data flows destined to the same destination task are identified as being part of the same flow group. In some embodiments, the processor(s) determine a size of the group flow as the total size of all the data flows destined for the distributed computing node. In some embodiments, the processor(s) may base these determinations on all data flows in a shuffle or stage of a task scheduling process, and/or in a set of data flows currently available for transmission.

In some embodiments, the processor(s) schedule the group flows for transmission in an order which prioritizes group flows having a larger size first. In some embodiments, the processor(s) schedule the group flows in descending order based on their sizes.

In some scenarios, distributed computing nodes receiving the largest amount of data will require the largest amount of time to execute a task on that data. Accordingly, as illustrated in the example above described with respect to FIGS. 2, 3A and 3B, by scheduling largest group flows first, the tasks receiving the largest group flows can begin executing first. In some situations, this may reduce the slowest completion time across a number of tasks.

In some embodiments, the processor(s) schedule group flows by assigning priority values to data flows. In some embodiments, these values are stored in a forwarding table. For example, a forwarding table may include a data entry including a flow identifier, and a priority value. In some embodiments, a data entry may also include a next hop identifier (e.g. a network node identifier, or data processing location identifier).

In some embodiments, the processor(s) schedule the group flows for transmission by prioritizing data flows for tasks which will require the largest estimated processing time. In some embodiments, the processor(s) may consider data flow size, task type (e.g. different tasks may have different computational complexities and may require different processing times for the same sized input data), historical task execution times, data processing resources assigned/available at the destination distributed computing node and/or any other factor.

Multi-Hop

In some embodiments, the processor(s) are configured to forward task data flow messages by forwarding at least a portion of the task data flow messages from a source distributed computing node to a destination network node via an intermediate network node.

Figure 11:
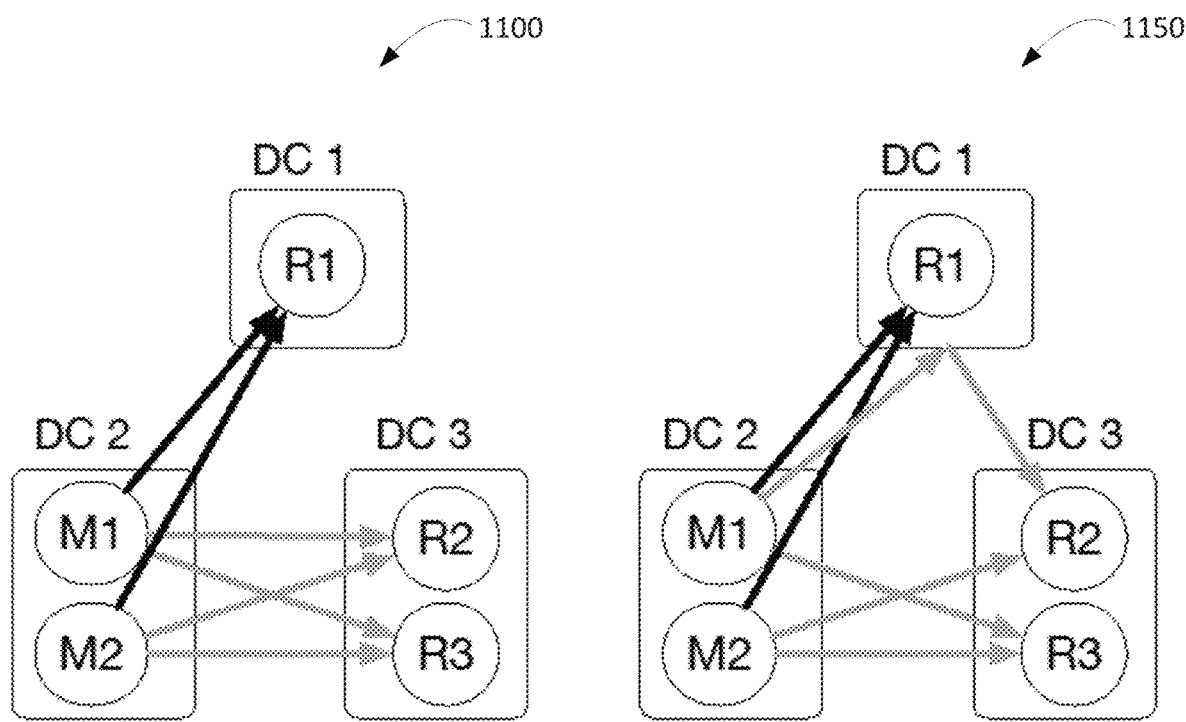
FIG. 11 is a diagram showing aspects of an example system and two example data flow scenarios.

FIG. 11 illustrated an example scenario involving two group flows. The first group flow includes data flows between data processing location DC 2 and data processing location DC 3 illustrated by the grey arrows. The second group flow includes data flows between data processing location DC 2 and data processing location DC 1 illustrated by the black arrows. In this example, all flows are 100 MB and the bandwidth between data processing locations is 10 MB/s.

In the scenario on the left 1100, each data flow is sent directly from the source data processing location to the destination data processing location. In this scenario, the communication link between DC 2 and DC 3 is the bottleneck resulting in a shuffle (data transfer) time of 40 seconds (i.e. 4×100 MB/10 MB/s).

As illustrated in the scenario on the right 1150, if the data flow from the source distributed computing node running task M1 to the destination distributed computing node assigned task R2 is routed via DC 1, the network load is better balanced between the links. With this routing, the shuffle time is 30 seconds.

Considering a Single Data Flow

In some embodiments, the processor(s) are configured to determine a bottleneck data connection in the system based on the time the data connection would require to transfer all of the assigned data flows if all the data flows were transmitted between network nodes across direct links.

The completion time $t_l$ to transfer a data flow of size $D_l$ over link l can be calculated as $t_l = D_l/B_l$, where $B_l$ is the bandwidth of the link.

The processor(s) identify the link with the largest completion time $t^*$ as the most heavily loaded link $l^*$, and select an alternative path which has a lightest load for traffic re-routing.

In some embodiments, the processor(s) are configured to compute a percentage of traffic $\alpha$ to be re-routed from $l^*$ based on the equation:

$$\frac{D_{l*}(1-\alpha)}{B_{l*}} = \frac{D_{l*}\alpha + D_{l'}}{B_{l'}}$$

where l' is the link with the heaviest load on the selected alternative path.

Considering Multiple Data Flows

In some embodiments, the processor(s) generate parameters for routing the different data flows based on link bandwidth data and data flow size data obtained from the system as described herein or otherwise. In some embodiments, the routing parameters (e.g. forwarding data entries) are communicated and stored in forwarding tables or otherwise at each network node along the corresponding paths. In some embodiments, the routing parameters include a flow identifier and an associated next-hop identifier.

In some embodiments, the processor(s) perform data flow scheduling operations by considering all inter-data processing location data flows in a set of data flows to be scheduled for transmission between distributed computing nodes/network nodes in the system. In some embodiments, the processor(s) are configured to consider optimal routing options for each group of flows while seeking to minimize the shuffle completion time (i.e. the time required for all data flows to be transferred). Generally, the shuffle completion time is the time at which the slowest data flow transfer has completed. In some instances, a data flow scheduling/assignment problem can be an NP-hard optimization problem.

However, in some embodiments, the aspects of the system (such as, for example, the controller) described herein may reduce the processor computations into a linear programming problem which, in some instances, may be computed efficiently.

Figure 12:
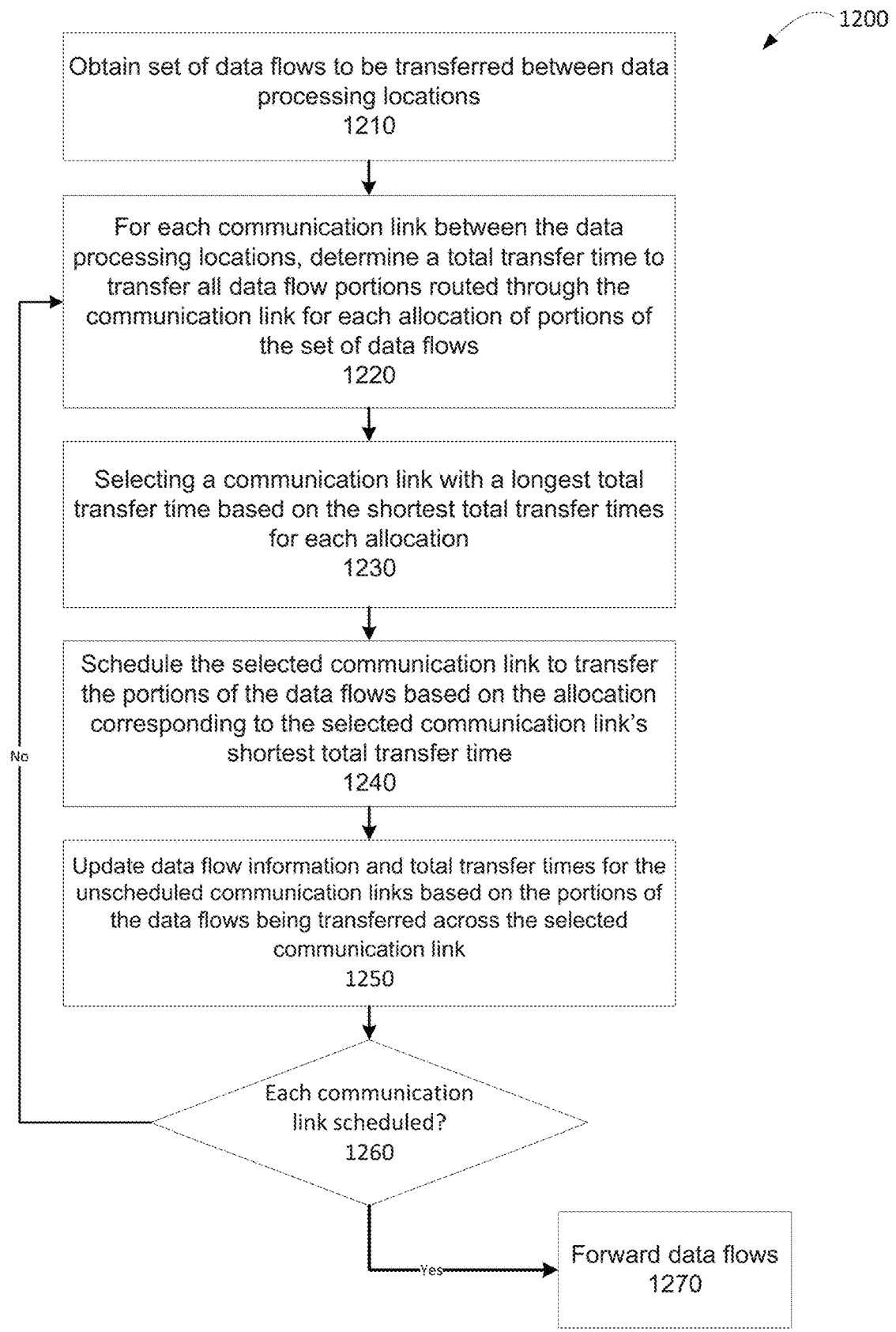
FIG. 12 is a diagram showing aspects of an example method for scheduling data flows.

FIG. 12 is a flowchart showing aspects of an example method 1200 for scheduling data flows between data processing locations in a distributed computing environment. In some scenarios, this method may consider sending portions of data flows over multiple paths to try to reduce the completion time for the data transfer stage of a set of data flows.

At 1210, as described herein or otherwise, one or more processors in the system obtains or otherwise identifies a set of data flows to be transferred between data processing locations. In some embodiments, a group of flows having the same source and destination data processing locations may be scheduled or otherwise considered as a single data flow. In some embodiments, the processor(s) obtains or otherwise determines the total size of each data flow.

In some embodiments, the processor(s) receives or otherwise obtains data identifying the available bandwidth on each communication link between the network nodes in the system.

In some embodiments, the processor(s) considers each possible path along which each data flow can be transferred, as well as different distributions of portions of a data flow across different paths. In other words, in some embodiments, the processor(s) determine how much of a data flow is transferred each available path in the system.

In some embodiments, the processor(s) consider each link (e.g. hop) along each available path between a source network node and a destination network node for each data flow.

At 1220, the processor(s) determine total transfer times to transfer all data flows portions routed through each communication link. In some instances, the processor(s) may generate, for each communication link, an array, vector or other arrangement of total transfer times. In some embodiments, the arrangement can include transfer times for each potential allocation of portions of the data flows for transfer over the respective communication link.

For example, with reference to FIG. 11, the communication link between DC 2 and DC 1 can in a first allocation as illustrated in the example scenario 1100 on the left, transfer 100% of the data flows M1-R1 and M2-R1. In some embodiments, these two data flows may be identified as a single data flow between the network node associated with DC 2 and the network node associated with DC 1.

In a second allocation as illustrated in the example scenario 1150 on the right, the communication link between DC 2 and DC 1 can transfer 100% of the data flows M1-R1 and M2-R1, and a portion of the data flow M1-R2.

These two different allocations may have different total transfer times.

In some embodiments, the processors determine the total transfer times based on the following equation:

$$t = \frac{\sum_i \sum_{j, l \in p(i,j)} d_i \alpha_{ij}}{b_l}$$

Where t is the total transfer time for a link l having a bandwidth $b_l$. The total transfer time is the total amount of data to be transferred over the link for the set of data flows $\forall i = \{1, 2, \ldots, I\}$. Any data flow i having a potential path j of the set of inter-network node links ($\forall j = \{1, 2, \ldots, J\}$ which includes the link l can have data transferred over the link. The total amount of data transferred over the link is based on the potential allocation (e.g. percentage) $\alpha_{ij}$ of a data flow i and the total size of the data flow $d_i$.

At 1230, the processor(s) select the unscheduled communication link having the longest total transfer time from the unscheduled communication links. In some embodiments, the processors select the communication link having the longest total transfer time based on the shortest total transfer times for the different allocations included in the selected job. In some instances, the selected communication link may represent a bottleneck in the data flow transfer process.

In some embodiments, the processor(s) identify the shortest total transfer time for each communication link, and from that set of shortest total transfer times, selects the communication link corresponding to the largest value.

In some embodiments, when multiple allocations have the same shortest total transfer time, the processor(s) are configured to select a communication link and/or allocation by applying a weighting factor which prioritizes direct paths or paths with fewer hops. In some instances, this may reduce traffic forwarding overhead.

At 1240, the processor(s) schedule to be transferred across the selected communication link, the portions/allocations of the data flows corresponding to the shortest total transfer time for the selected communication link.

In some embodiments, scheduling data flow portions/allocations to be transferred over the communication link includes scheduling the data flow portions/allocations to previous and/or next hops along the paths of the corresponding data flows.

At 1250, the processors update the data flow information and total transfer times based on the portions of the data flows being transferred across the selected communication link. In some embodiments, updating the data flow information includes removing the communication link from a set of links available to transfer the remaining data flow portions. In some embodiments, updating the data flow information include reducing the size of the remaining data in a data flow to be transferred based on a portion of the data flow that have been assigned to the selected communication link.

In some embodiments, updating the total transfer times includes re-determining the total transfer times based on an updated set of paths and/or data flow portion allocations.

While each communication link has not yet been scheduled 1260, the processors repeat the process starting at 1220.

At 1270, when each communication link has been scheduled, the processors generate and/or transmit instructions or other signals to forward the data flows based on the schedule. In some embodiments, the processor(s) generate data for forwarding tables or otherwise provide instructions or data to network nodes to forward the data flows based on the schedule and assigned communication links.

In some embodiments, the processor(s) may transmit instructions which trigger the network nodes to initiate the transfer of the data flows.

In some instances, multi-path routing problems can be defined as integer optimization problems which are generally considered to computationally complex problems. In some examples, this may allow the scheduling of data flows to be performed more effectively by the system.

Based on the terminology above, in some situations, determining an multi-path routing schedule aiming to minimize a shuffle completion time may be represented by a minimization function:

$$\min_{\alpha_{ij}} t$$

$$\text{s.t. } t = \max_{l \in p} \frac{\sum_i \sum_{j,l \in p(i,j)} d_i \alpha_{ij}}{b_l}$$

With the constraints that the sum of the data flow portions allocated to each of its paths is 1 or 100%, $$\sum_{j=1}^{J_i} \alpha_{ij} = 1, \forall\, i \in \{1, 2, \ldots, I\}$$

And an allocation cannot be negative:

$$\alpha_{ij} \geq 0, \forall\, i,j \in \{1,2,\ldots,J_i\}$$

In some embodiments, to potentially reduce the effect of a bottleneck communication link, the communication link having the longest optimal total data transfer time can be assigned first, and in subsequent iterations, the communication link having the next longest optimal completion time can be scheduled.

In some embodiments, the processors are configured to populate one or more data structures representing parameters for solving some or all aspects of the above-noted linear programming model. In some embodiments, the data structures by matrices, vectors, or any other suitable data format.

In some embodiments, the data structures encapsulate communication link assignment parameters, data flow portions/allocations, data flow sizes, link bandwidths, total data transfer times and/or multi-hop weights.

In some embodiments, the processors executed one or more linear programming processes on the populated data structures to identify optimal multi-hop scheduling for the portions of the data flows. In some embodiments, the linear programming processes may be implemented with MOSEK™ or other linear programming solver packages.

Multicast

In some distributed computing jobs, outputs from one or more tasks may be required by multiple or all subsequent tasks in the next stage of the job. In some situations, this may result in a mesh of data flows which may be limited by available data connections. In some embodiments, aspects of the system may provide a multicast service which in some instances may reduce shuffle data transfer times.

In some embodiments, rather than broadcast multiple data flows from a source network node directly to all destination network nodes, the processors may generate a multicast distribution graph. In some embodiments, the multicast distribution graph includes a first branch between the source network node and a first destination network node, and a second branch between the first destination network node and a second destination network node. In some embodiments, the first destination network node is associated with a data processing location and/or distributed computing node which has been assigned a task having a longest execution time. In some situations, sending the data flow to the node requiring the most time to execute a task allows the task to start execution sooner. In some situations, the multicast distribution graph may reduce network traffic and/or may be generated to avoid bottleneck communication links in the system.

Example Scenarios

Figure 13:
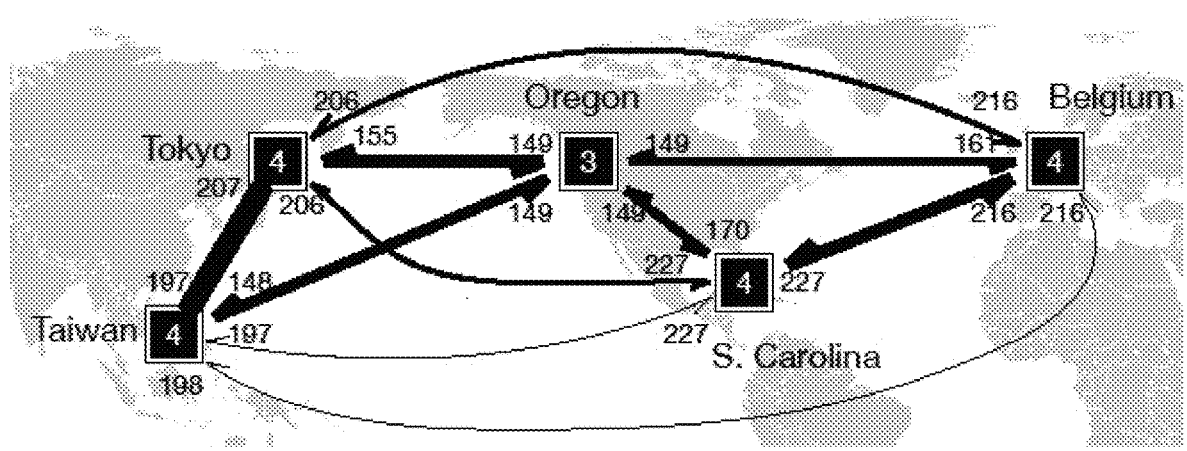
FIG. 13 is a diagram showing aspects of an example geo-distributed computing system.

FIG. 13 shows an example data processing environment 1300 having five geodistributed data processing locations (datacenters: S. Carolina, Oregon, Belgium, Taiwan, and Tokyo). In one experiment scenario, 40 n1-highmem-2 instances are disseminated across the five datacenters. Each instance provides 2 vCPUs, 13 GB of memory and 20 GB SSD of disk storage. Network nodes are configured to run on 10 of the distributed computing nodes, 2 in each datacenter. A network node is responsible for handling publish/subscribe requests from 4 distributed computing nodes in the same datacenter.

In one experiment, six different machine learning workloads with multiple jobs and multiple stages are used for evaluation:

ALS: Alternating Least Squares.
PCA: Principle Component Analysis.
BMM: Block Matrix Multiplication.
Pearson: Pearson's correlation.
W2V: Word2Vec distributed presentation of words.
FG: FP-Growth frequent item sets.

Figure 14:
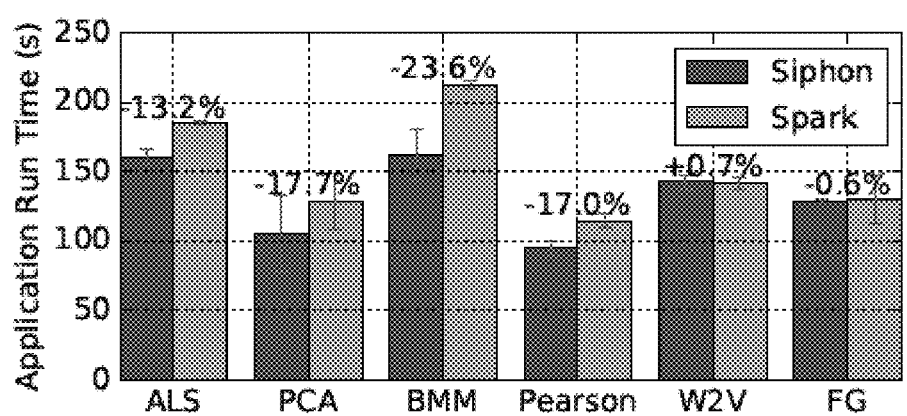
FIG. 14 shows a table and chart showing test results for data communications in an example distributed computing environment.

FIG. 14 shows a table 1400 illustrating the reducing in shuffle read times (data transfer times) for Siphon which represents aspects of the network communication system described herein in comparison to a traditional Spark™ implemented system. In the Siphon implementation, the system is configured to implement largest flow group first and multi-path routing.

For every workload, the Siphon system provided a reduction in the data transfer times.

The graph 1450 shows the change in application run times for the two systems. The Siphon system shows an improvement in most of the workloads. The W2V and FG workloads represent workloads whose computation time dominates the application execution. In these types of workloads, reducing data transfer times will have smaller effects on the overall application run time.

In another experiment scenario, using the same geographically diverse datacenters in FIG. 13, 19 workers and one master spanning the five datacenters are implemented. The master is situation in Oregon and the 19 workers are distributed as indicated in the black squares in FIG. 13. A Sort application from the Hi-Bench™ benchmark suite is run using different scheduling approaches as described herein:

Spark™: traditional Spark™ baseline framework
Naïve: application of the network communication system described herein without any flow scheduling or multi-path decision makers
Multi-path: Naïve scheme with a multi-path rooting decision maker
Siphon: Largest flow group first and multi-path routing.

Figure 15:
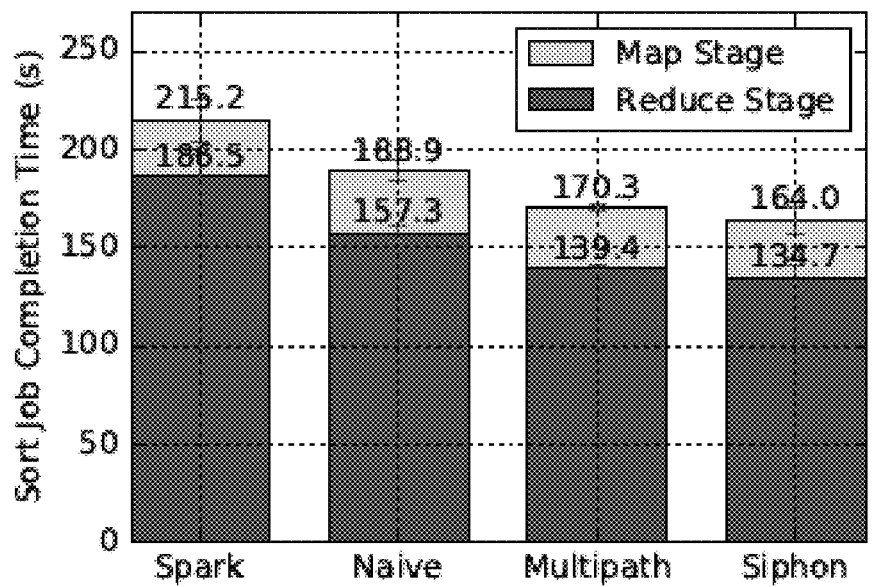
FIG. 15 shows two charts showing test results for data communications using different routing approaches.
Figure 15:
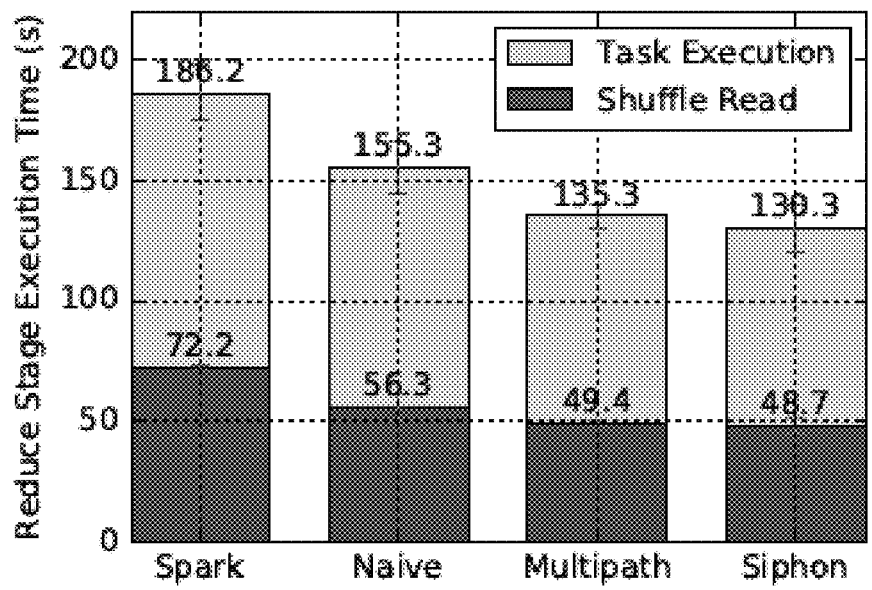

The Sort application has two stages, a Map stage and a Sort stage with a data shuffle between the stages. Using a 2.73 GB data set, the results are illustrated in FIG. 15.

The top graph 1500 shows the completion times of the two stages for the different approaches. The bottom graph 1550 shows the breakdown between the data transfer time and the task execution time for the Reduce stage of the application.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for data communication in a distributed computing environment, the system comprising:
   at least one processor configured to:
      provide a first network node associated with a first data processing location, the first network node configured to:
         provide a network interface for a first distributed computing node at the first data processing location;
         encapsulate data flows received from the first distributed computing into application-layer messages, each application-layer message including a field identifying a destination task execution process for each data flow of the data flows; and
      forward the application-layer messages to a second network node associated with a second data processing location for forwarding to the destination task execution process at a second distributed computing node at the second data processing location.

2. The system of claim 1, wherein the at least one processor is configured to:
provide a controller configured to obtain task data flow information for a plurality of task execution processes operating at the first distributed compute node and a plurality of task execution processes operating at other distributed compute nodes at the first data processing location in the distributed computing environment; and
wherein the application-layer messages received from the first distributed computing node are forwarded to the second network node over one or more data connections selected based on the task data flow information.

3. The system of claim 1, wherein the first network node is configured to establish at least one persistent connection with the second network node over which the application-layer messages are forwarded.

4. The system of claim 3, wherein the first network node is configured to aggregate data flows received from a plurality of task execution processes operating at a plurality of distributed distinct computing nodes at the first data processing location for transmission over the at least one persistent connection.

5. The system of claim 1, wherein the first network node is configured to establish a plurality of connections with the second network node.

6. The system of claim 1, wherein the first network node is a software-implemented application-layer network node.

7. The system of claim 2, wherein the first network node is configured to forward the application-layer task data messages over the one or more data connections based on a largest flow group first schedule.

8. The system of claim 2, wherein the controller is configured to obtain data flow information for a plurality of data flows to be transferred between a plurality of tasks scheduled for execution at a plurality of data processing locations over communication links between network nodes associated with each of the data processing locations.

9. The system of claim 8 wherein the controller is configured to:
obtain the plurality of data flows to be transferred between the plurality of tasks scheduled for execution at the plurality of data processing locations;
for each communication link between each network node associated with a data processing location, determine a total transfer time to transfer all data flow portions routed through the communication link for each allocation of portions of the plurality of data flows;
select, from the communication links, a communication link having a largest total transfer time based on the shortest total transfer time for the communication links; and
schedule the portions of the plurality of data flows corresponding to the shortest total transfer time for transfer across the selected communication link.

10. The system of claim 9, wherein the controller is configured to:
until the plurality of data flows has been scheduled for transfer across each communication link, repeat: updating the data flow information and the total transfer time for the communication links based on the portions of the plurality of data flows being transferred across a previously selected communication link as scheduled; selecting, from the communication link, the communication link having the largest total transfer time based on the shortest total transfer time for the communication links; and scheduling the portions of the plurality of data flows corresponding to the shortest total transfer time for transfer across the selected communication link.

11. The system of claim 1, wherein forwarding the application-layer messages comprises forwarding at least a portion of the application-layer messages from the first distributed computing node to the second network node via a third network node.

12. The system of claim 1, wherein the at least one processor is configured to:
generate a multicast distribution graph including:
a first branch between the first network node the second network node and a second branch between the second network node and a third node associated with the second data processing location, wherein the first network node is further configured to forward the application-layer messages to the second network node and to a third network node associated with a third data processing location for forwarding to the destination task execution process at a third distributed computing node at the third data processing location based on the multicast distribution graph, and wherein the second network node associated with the second data processing location is assigned a task execution process having a longest execution time.

13. The system of claim 2, wherein the controller is configured to monitor performance data regarding one or more communication links between the first network node and the second network node, and forward the application-layer messages from the first distributed computing node to the second network node over one or more data connections selected based on the performance data.

14. A method for data communication in a distributed computing environment, the method comprising:
receiving, at a first network node associated with a first data processing location, the first network node providing a network interface for a first distributed computing node at the first data processing location; and
encapsulating, at the first network node, data flows received from the first distributed computing into application-layer messages, each application-layer message including a field identifying a destination task execution process for each data flow of the data flows;
forwarding, by the first network node, the application-layer messages to a second network node associated with a second data processing location for forwarding to the destination task execution process at a second distributed computing node at the second data processing location.

15. The method of claim 14, comprising:
provide a controller configured to obtain task data flow information for a plurality of task execution processes operating at the first distributed compute node and a plurality of task execution processes operating at other distributed compute nodes at the first data processing location in the distributed computing environment; and
wherein the application-layer messages received from the first distributed computing node are forwarded to the second network node over one or more data connections selected based on the task data flow information.

16. The method of claim 14, wherein the first network node is configured to establish at least one persistent connection with the second network node over which the application-layer messages are forwarded.

17. The method of claim 16, wherein the first network node is configured to aggregate data flows received from a plurality of task execution processes operating at a plurality of distributed distinct computing nodes at the first data processing location for transmission over the at least one persistent connection.

18. The method of claim 14, wherein the first network node is configured to establish a plurality of connections with the second network node.

19. The method of claim 14, wherein the first network node is a software-implemented application-layer network node.

20. The method of claim 15, comprising forwarding the application-layer messages over the one or more data connections based on a largest flow group first schedule.

21. The method of claim 15, wherein the controller is configured to obtain data flow information for a plurality of data flows to be transferred between a plurality of tasks scheduled for execution at a plurality of data processing locations over communication links between network nodes associated with each of the data processing locations.

22. The method of claim 21 comprising:
obtain the plurality of data flows to be transferred between the plurality of tasks scheduled for execution at the plurality of data processing locations;
for each communication link between each network node associated with a data processing location, determining a total transfer time to transfer all data flow portions routed through the communication link for each allocation of portions of the plurality of data flows;
selecting, from the communication links, a communication link having a largest total transfer time based on the shortest total transfer time for the communication links; and
scheduling the portions of the plurality of data flows corresponding to the shortest total transfer time for transfer across the selected communication link.

23. The method of claim 22, comprising:
until the plurality of data flows has been scheduled for transfer across each communication link, repeat: updating the data flow information and the total transfer time for the communication links based on the portions of the plurality of data flows being transferred across a previously selected communication link as scheduled; selecting, from the communication link, the communication link having the largest total transfer time based on the shortest total transfer time for the communication links; and scheduling the portions of the plurality of data flows corresponding to the shortest total transfer time for transfer across the selected communication link.

24. The method of claim 14, wherein forwarding the application-layer messages comprises forwarding at least a portion of the application-layer messages from the first distributed computing node to the second network node via a third network node.

25. The method of claim 14, comprising:
generating a multicast distribution graph including:
a first branch between the first network node and the second network node and a second branch between the second network node and a third node associated with the second data processing location, wherein the first network node is further configured to forward the application-layer messages to the second network node and to a third network node associated with a third data processing location for forwarding to the destination task execution process at a third distributed computing node at the third data processing location based on the multicast distribution graph, and wherein the second network node associated with the second data processing location is assigned a task execution process having a longest execution time.

26. The method of claim 15, wherein the controller is configured to monitor performance data regarding one or more communication links between the first network node and the second network node, and forward the application-layer messages from the first distributed computing node to the second network node over one or more data connections selected based on the performance data.

27. A non-transitory, computer-readable medium or media having stored thereon computer-readable instructions which when executed by at least one processor configure the at least one processor for:
providing a first network node associated with a first data processing location, the first network node configured to:
provide a network interface for a first distributed computing node at the first data processing location;
encapsulate data flows received from the first distributed computing into application-layer messages, each application-layer message including a field identifying a destination task execution process for each data flow of the data flows; and
forwarding the application-layer messages to a second network node associated with a second data processing location for forwarding to the destination task execution process at a second distributed computing node at the second data processing location.

* * * * *

UNITED STATES PATENT AND TRADEMARK OFFICE
CERTIFICATE OF CORRECTION

PATENT NO. : 10,628,236 B2  
APPLICATION NO. : 15/615018  
DATED : April 21, 2020  
INVENTOR(S) : Shuhao Liu et al.

Page 1 of 1

It is certified that error appears in the above-identified patent and that said Letters Patent is hereby corrected as shown below:

On the Title Page

Item (73) Assignees, Line 2, delete "Ottawa" and insert --Kanata--.

Item (73) Assignees, Line 3, delete "Univeristy" and insert --University--.

Item (73) Assignees, Line 4, delete "Banting Institute".

Signed and Sealed this  
Twenty-second Day of December, 2020

Andrei Iancu  
*Director of the United States Patent and Trademark Office*